United States Patent
Shih et al.

(10) Patent No.: US 12,363,793 B2
(45) Date of Patent: Jul. 15, 2025

(54) METHOD OF SLICE-BASED CELL RESELECTION AND RELATED DEVICE

(71) Applicant: SHARP KABUSHIKI KAISHA, Sakai (JP)

(72) Inventors: Mei-Ju Shih, Taipei (TW); Hung-Chen Chen, Taipei (TW); Yung-Lan Tseng, Taipei (TW); Ming-Hung Tao, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 305 days.

(21) Appl. No.: 17/879,344

(22) Filed: Aug. 2, 2022

(65) Prior Publication Data

US 2023/0030150 A1    Feb. 2, 2023

Related U.S. Application Data

(60) Provisional application No. 63/203,863, filed on Aug. 2, 2021.

(51) Int. Cl.
*H04W 76/30*    (2018.01)
*H04W 48/18*    (2009.01)

(52) U.S. Cl.
CPC .......... *H04W 76/30* (2018.02); *H04W 48/18* (2013.01)

(58) Field of Classification Search
CPC ..... H04W 76/30; H04W 48/18; H04W 48/20; H04W 8/186; H04W 36/12
See application file for complete search history.

(56) References Cited

U.S. PATENT DOCUMENTS

| 2020/0120547 A1 | 4/2020 | Han et al. |
| 2022/0225189 A1 | 7/2022 | Kang et al. |

(Continued)

FOREIGN PATENT DOCUMENTS

| CN | 109246775 A | 1/2019 |
| CN | 112425205 A | 2/2021 |

OTHER PUBLICATIONS

Qualcomm Incorporated, "Further discussion on slice specific cell reselection", 3GPP TSG RAN WG2 Meeting #114-e E-Conference, May 19-27, 2021, R2-2104740.

(Continued)

*Primary Examiner* — Pao Sinkantarakorn
*Assistant Examiner* — Kabir U Jahangir
(74) *Attorney, Agent, or Firm* — ScienBiziP, P.C.

(57) ABSTRACT

A method for a UE for performing slice-based cell reselection is provided. The method includes receiving slice priority information including at least one slice and at least one priority value associated with the at least one slice; receiving frequency priority information including one or more slices, at least one frequency supporting the one or more slices, and one or more priority values associated with the one or more slices; selecting a first slice based on the slice priority information; determining whether a cell on the at least one frequency in the frequency priority information supports the first slice; reselecting a second slice when the UE determines that the cell does not support the first slice; and based on the second slice, the slice priority information, and the frequency priority information, determining at least one reselection priority for the at least one frequency in the frequency priority information.

20 Claims, 4 Drawing Sheets

(56) References Cited

U.S. PATENT DOCUMENTS

| | | | | |
|---|---|---|---|---|
| 2023/0055788 A1* | 2/2023 | Jung | ................. | H04W 36/0061 |
| 2023/0156583 A1* | 5/2023 | Murray | ................. | H04W 48/20 |
| | | | | 370/329 |
| 2023/0262591 A1* | 8/2023 | Ishii | ..................... | H04W 48/20 |
| | | | | 370/331 |
| 2024/0073761 A1* | 2/2024 | Fu | ..................... | H04W 36/0061 |
| 2024/0121710 A1* | 4/2024 | Cheng | ................... | H04W 48/18 |

OTHER PUBLICATIONS

Lenovo, Motorola Mobility (Rapporteur), "Summary of [AT114-e][250][Slicing] Usage of slice priorities for cell", 3GPP TSG-RAN WG2 Meeting #114 e E-Meeting, May 19-27, 2021, R2-2106501.
3GPP TS 38.304 V16.1.0 (Jul. 2020), 3rd Generation Partnership Project; Technical Specification Group Radio Access Network; NR; User Equipment (UE) procedures in Idle mode and RRC Inactive state (Release 16).
Nokia et al: "Slice specific cell reselection", 3GPP Draft; R2-2105240, 3GPP TSG-RAN WG2 Meeting #114 Electronic, May 19-27, 2021.
Samsung: "On slice priority for cell reselection", 3GPP Draft; R2-2108316, 3GPP TSG-RAN WG2 Meeting #115-e, Online, Aug. 9-27, 2021.

\* cited by examiner

METHOD OF SLICE-BASED CELL RESELECTION AND RELATED DEVICE

CROSS-REFERENCE TO RELATED APPLICATION(S)

The present disclosure claims the benefit of and priority to U.S. Provisional Patent Application Ser. No. 63/203,863, filed on Aug. 2, 2021, entitled "METHOD AND APPARATUS FOR SLICE-BASED CELL RESELECTION," the content of which is hereby fully incorporated herein by reference into the present disclosure.

FIELD

The present disclosure is generally related to wireless communications and, more specifically, to a method of slice-based cell reselection and a related device configured to employ the method.

BACKGROUND

With the tremendous growth in the number of connected devices and the rapid increase in user/network traffic volume, various efforts have been made to improve different aspects of wireless communication for next-generation wireless communication systems, such as the fifth-generation (5G) New Radio (NR) system, by improving data rate, latency, reliability, and mobility.

The 5G NR system is designed to provide flexibility and configurability for optimizing network services and types, and accommodating various use cases, such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication in next-generation wireless communication systems. In the next-generation cellular network, a slice-based cell reselection under network control is suggested to enable the UE to quickly access a cell that supports the UE's intended slice, so as to realize energy efficiency. However, there is no specification about how the UE performs the slice-based cell reselection (e.g., intra-frequency/inter-frequency/inter-RAT cell reselection) mechanism. Thus, when the UE first camps on a cell that does not support the UE's intended slice, the UE may not know how to perform the cell reselection (e.g., slice-based cell reselection) in an energy-efficient and time-efficient manner.

SUMMARY

The present disclosure provides a method of slice-based cell reselection and a related device.

According to an aspect of the present disclosure, a method for a user equipment (UE) for performing slice-based cell reselection is provided. The method includes receiving, from a non-access stratum (NAS) layer of the UE, by an access stratum (AS) layer of the UE, slice priority information that includes at least one slice and at least one priority value associated with the at least one slice; receiving, from a serving cell, frequency priority information that includes one or more slices, at least one frequency that supports the one or more slices, and one or more priority values associated with the one or more slices; selecting a first slice of the at least one slice based on the slice priority information; in response to selecting the first slice, determining whether a cell on the at least one frequency indicated in the frequency priority information supports the first slice, the cell being detected by the UE according to a ranking criterion that is associated with a signal strength measurement; reselecting a second slice of the at least one slice when the UE determines that the cell does not support the first slice; and based on the second slice, the slice priority information and the frequency priority information, determining at least one reselection priority for the at least one frequency indicated in the frequency priority information, wherein a first reselection priority of the at least one reselection priority for a first frequency of the at least one frequency indicated in the frequency priority information is determined according to a first priority value of the one or more priority values indicated in the frequency priority information, the first frequency supports the second slice, and the first priority value is associated with the second slice.

According to another aspect of the present disclosure, a UE for performing slice-based cell reselection is provided. The UE includes at least one processor, and at least one memory coupled to the at least one processor and storing computer-executable instructions that, when executed by the at least one processor, cause the UE to perform the above-disclosed method of performing the slice-based cell reselection.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
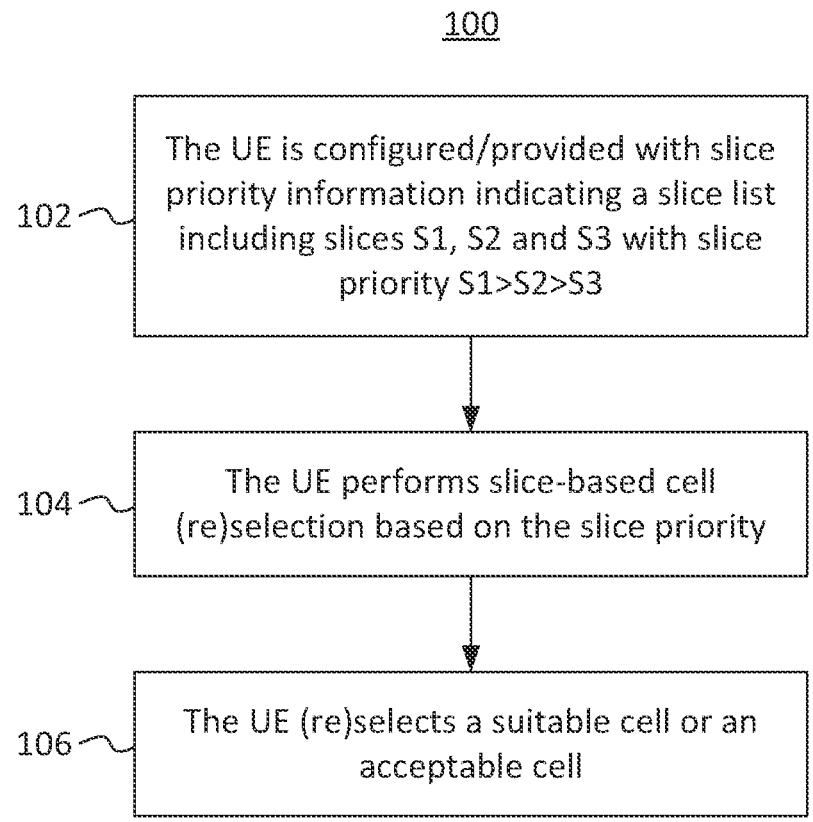
FIG. 1 is a flowchart illustrating a slice-based cell reselection with slice priority, according to an implementation of the present disclosure.

The following disclosure contains specific information pertaining to exemplary implementations in the present disclosure. The drawings and their accompanying detailed disclosure are directed to exemplary implementations. However, the present disclosure is not limited to these exemplary implementations. Other variations and implementations of the present disclosure will occur to those skilled in the art. Unless noted otherwise, like or corresponding elements in the drawings may be indicated by like or corresponding reference numerals. Moreover, the drawings and illustrations are generally not to scale and are not intended to correspond to actual relative dimensions.

For consistency and ease of understanding, like features are identified (although, in some examples, not shown) by reference designators in the exemplary drawings. However, the features in different implementations may be different in other respects, and therefore shall not be narrowly confined to what is illustrated in the drawings.

The phrases "in one implementation," and "in some implementations," may each refer to one or more of the same or different implementations. The term "coupled" is defined as connected, whether directly or indirectly via intervening components, and is not necessarily limited to physical connections. The term "comprising" may mean "including, but not necessarily limited to" and specifically indicates open-ended inclusion or membership in the disclosed combination, group, series, and equivalents.

The term "and/or" herein is only an association relationship for describing associated objects and represents that three relationships may exist. For example, A and/or B may represent that: A exists alone, A and B exist at the same time, and B exists alone. "A and/or B and/or C" may represent that at least one of A, B, and C exists, A and B exist at the same time, A and C exist at the same time, B and C exist at the same time, and A, B and C exist at the same time. Further, the character "/" used herein generally represents that the former and latter associated objects are in an "or" relationship.

A UE may be referred to as Physical Layer (PHY), Medium Access Control (MAC), Radio Link Control (RLC), Packet Data Convergence Protocol (PDCP), Service Data Adaptation Protocol (SDAP), Radio Resource Control (RRC), Access Stratum (AS) or Non-Access Stratum (NAS) layer/entity. The PHY/MAC/RLC/PDCP/SDAP/RRC/AS/NAS layer/entity may be referred to as the UE.

A network (NW) may be a network node, a Transmission/Reception Point (TRP), a cell (e.g., Special Cell (SpCell), Primary Cell (PCell), Primary SCell (PSCell), and/or Secondary Cell (SCell)), an eNB, a gNB, and/or a base station.

Serving Cell: A PCell, a PSCell, or an SCell. The serving cell may be an activated or a deactivated serving cell.

SpCell: For Dual Connectivity operation, the term Special Cell refers to the PCell of a Master Cell Group (MCG) or the PSCell of a Secondary Cell Group (SCG) depending on if the MAC entity is associated to the MCG or the SCG, respectively. Otherwise, the term Special Cell refers to the PCell.

The terms "initiate", "trigger", "apply", "store", and "start" may be interchangeably used in some implementations of the present disclosure.

The terms "terminate", "stop", "release", "suspend", "discard", "end", "complete", "abort", and "cancel" may be interchangeably used in some implementations of the present disclosure.

The terms "period", "process", "phase", and "duration" may be interchangeably used in some implementations of the present disclosure.

The terms "resource" and "occasion" may be interchangeably used in some implementations of the present disclosure.

The terms "ongoing", "running", and "pending" may be interchangeably used in some implementations of the present disclosure.

The terms "mechanism", "scheme", and "functionality" may be interchangeably used in some implementations of the present disclosure.

The terms "mapped to" and "associated with" may be interchangeably used in some implementations of the present disclosure.

Additionally, any two or more of the following paragraphs, (sub)-bullets, points, actions, behaviors, terms, alternatives, examples, or claims in the present disclosure may be combined logically, reasonably, and properly to form a specific method. Any sentence, paragraph, (sub)-bullet, point, action, behavior, term, or claim in the present disclosure may be implemented independently and separately to form a specific method. Dependency, e.g., "based on", "more specifically", "preferably", "in one embodiment", "in one implementation", "in one alternative", in the present disclosure may refer to just one possible example that would not restrict the specific method.

For a non-limiting explanation, specific details, such as functional entities, techniques, protocols, standards, and the like, are set forth for providing an understanding of the disclosed technology. In other examples, detailed disclosure of well-known methods, technologies, systems, and architectures are omitted so as not to obscure the present disclosure with unnecessary details.

Persons skilled in the art will recognize that any disclosed network function(s) or algorithm(s) may be implemented by hardware, software, or a combination of software and hardware. Disclosed functions may correspond to modules that may be software, hardware, firmware, or any combination thereof. The software implementation may include computer-executable instructions stored on a computer-readable medium, such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Application-Specific Integrated Circuits (ASICs), programmable logic arrays, and/or one or more Digital Signal Processors (DSPs). Although some of the disclosed implementations are directed to software installed and executing on computer hardware, nevertheless, alternative implementations as firmware, as hardware, or as a combination of hardware and software are well within the scope of the present disclosure.

The computer-readable medium may include, but may not be limited to, Random Access Memory (RAM), Read-Only Memory (ROM), Erasable Programmable Read-Only Memory (EPROM), Electrically Erasable Programmable Read-Only Memory (EEPROM), flash memory, Compact Disc (CD) Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, an LTE-Advanced Pro system, or a New Radio (NR) system) may typically include at least one base station (BS), at least one UE, and one or more optional network elements that provide connection with a network. The UE may communicate with the network (e.g., a Core Network (CN), an Evolved Packet Core (EPC) network, an Evolved Universal Terrestrial Radio Access Network (E-UTRAN), a Next-Generation Core (NGC), a 5G Core (5GC), or an internet) via a Radio Access Network (RAN) established by one or more BSs.

A UE, according to the present disclosure, may include, but is not limited to, a mobile station, a mobile terminal or device, or a user communication radio terminal. For example, a UE may be a portable radio equipment that includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

ABS may include, but is not limited to, a node B (NB) as in the Universal Mobile Telecommunication System (UMTS), an evolved node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) RAN (GERAN), a next-generation eNB (ng-eNB) as in an Evolved Universal Terrestrial Radio Access (E-UTRA) BS in connection with the 5GC, a next-generation Node B (gNB) as in the 5G-RAN (or in the 5G Access Network (5G-AN)), and any other apparatus capable of controlling radio communication and managing radio resources within a cell. The BS may connect to serve the one or more UEs via a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) according to basic Wideband-Code Division Multiple Access (W-CDMA), High-Speed Packet Access (HSPA), LTE, LTE-A, enhanced LTE (eLTE), NR (often referred to as 5G), and/or LTE-A Pro. However, the scope of the present disclosure is not limited to these protocols.

The BS may be operable to provide radio coverage to a specific geographical area using a plurality of cells forming the RAN. The BS may support the operations of the cells. Each cell may be operable to provide services to at least one UE within its radio coverage. More specifically, each cell (often referred to as a serving cell) may provide services to one or more UEs within its radio coverage (e.g., each cell schedules the downlink (DL) and optionally UL resources to at least one UE within its radio coverage for DL and optionally UL packet transmissions). The BS may communicate with one or more UEs in the radio communication system via the plurality of cells.

A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As disclosed previously, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the 3rd Generation Partnership Project (3GPP), may serve as a baseline for an NR waveform. The scalable OFDM numerology, such as the adaptive subcarrier spacing, the channel bandwidth, and the cyclic prefix (CP), may also be used. Additionally, two coding schemes are applicable in NR: (1) low-density parity-check (LDPC) code and (2) polar code. The coding scheme adaptation may be configured based on the channel conditions and/or the service applications.

Moreover, in a transmission time interval of a single NR frame, at least DL transmission data, a guard period, and UL transmission data should be included. The respective portions of the DL transmission data, the guard period, and the UL transmission data should also be configurable, for example, based on the network dynamics of NR. An SL resource may also be provided via an NR frame to support ProSe services or V2X services.

Slice-Based Cell Reselection

The slice-based cell reselection includes slice-based intra-frequency cell reselection, slice-based inter-frequency cell reselection, and slice-based inter-RAT cell reselection.

During the slice-based intra-frequency cell reselection, the UE may reselect a cell on an intra-frequency basis by considering at least one of the UE's intended slice(s), the slice priority(-ies), the slice information of the serving cell, and the slice information of the neighboring cells. The intra-frequency may be the same frequency the UE is operating on (e.g., the frequency or the serving cell on which the UE is currently camped) when the UE performs the slice-based intra-frequency cell reselection. The neighboring cells in the slice-based intra-frequency cell reselection may refer to those neighboring cells on the same frequency the UE is operating on (e.g., the frequency or the serving cell on which the UE is currently camped) when the UE performs the slice-based intra-frequency cell reselection.

During the slice-based inter-frequency cell reselection, the UE may reselect a cell on an inter-frequency basis by considering at least one of the UE's intended slice(s), the slice priority(-ies), the frequency priority(-ies), the slice information of the serving cell, and the slice information of the neighboring cells. The inter-frequency may be a different frequency from the frequency the UE is operating on (e.g., the frequency or the serving cell on which the UE is currently camped) when the UE performs the slice-based inter-frequency cell reselection. The neighboring cells in the slice-based inter-frequency cell reselection may refer to those neighboring cells on a different frequency from the frequency the UE is operating on (e.g., the frequency or the serving cell on which the UE is currently camped) when the UE performs the slice-based inter-frequency cell reselection or those neighboring cells on a different frequency from the frequency the UE is operating on when the UE performs the slice-based inter-frequency cell reselection.

During the slice-based inter-RAT cell reselection, the UE may reselect a cell on an inter-RAT basis by considering at least one of the UE's intended slice(s), the slice priority(-ies), the frequency priority-(ies), the redirection information, the slice information of the serving cell (on the source RAT), the slice information of the neighboring cells (on the source RAT), the slice information of the target RAT, and the slice information of the neighboring cells on the target RAT. The inter-RAT may be a different RAT from the RAT the UE is operating on (e.g., the RAT or the serving cell on which the UE currently camped) when the UE performs the slice-based inter-RAT cell reselection. The neighboring cells in the slice-based inter-RAT cell reselection may refer to those neighboring cells on the same frequency the UE is operating on when the UE performs the slice-based inter-RAT cell reselection, or those neighboring cells on a different frequency from the frequency the UE is operating on when the UE performs the slice-based inter-RAT cell reselection but on the same RAT the UE operating on when the UE performs the slice-based inter-RAT cell reselection, or those neighboring cells on a different RAT from the RAT the UE is operating on when the UE performs the inter-RAT cell reselection.

UE's Intended Slice(s)

The UE may be (pre)configured with the UE's intended slice(s) by the NW. For example, the NW (e.g., Access and Mobility Management Function (AMF), serving cell) may transmit Single-Network Slice Selection Assistance Information (S-NSSAI) to the UE as the UE's intended slice(s). The NW (e.g., AMF) may transmit the NAS signaling including the S-NS SAI(s) to the UE via the BS, and the UE may receive an RRC message including the NAS signaling from the BS. The NAS layer of the UE may therefore receive the NAS signaling encapsulated in the RRC message from the RRC layer of the UE. The S-NSSAI(s) may be (but is not limited to) the allowed S-NSSAI(s) that the NW allows the UE to apply and connect to the NW, or the configured S-NSSAI(s) that the NW configures the UE to apply and connect to the NW. The difference between the allowed S-NSSAI(s) and the configured S-NSSAI(s) may be that the allowed S-NSSAI(s) is determined by the NW based on the UE's requested S-NSSAI(s), while the configured S-NSSAI(s) may be determined by the NW not based on the UE's requested S-NSSAI(s). Thus, it is possible that the allowed S-NSSAI(s) may be the same as or, a subset of, the UE's requested S-NSSAI(s). The configured S-NSSAI(s) may be the same as, or different from, the UE's request S-NSSAI(s).

It should be noted that the UE may transmit the UE's requested S-NSSAI(s) to the NW via the serving cell to request the NW to support the UE's requested S-NSSAI(s).

It should be noted that the UE may transmit the UE's requested S-NSSAI(s) in an RRC message (e.g., RRC (Connection) Setup Complete message) to the serving cell to assist the serving cell to select an AMF that supports the UE's request S-NSSAI(s).

In some examples, the UE may request the UE's intended slice(s) to the NW directly. The requested S-NSSAI(s) that the UE transmits to the NW may be exactly the same as the UE's intended slices, the requested S-NSSAI(s) that the UE transmits to the NW may be part of the UE's intended slices, or the requested S-NSSAI(s) that the UE transmits to the NW may include the UE's intended slices. For example, the UE may transmit an RRC message (e.g., Msg5 in a random access (RA) procedure, RRC (Connection) Setup Complete message, RRC (Connection) Resume Complete message) including the (requested) S-NSSAI(s) to the NW (e.g., AMF, serving cell) via the BS. The BS may perform AMF selection based on the received requested S-NSSAI(s) in the RRC message. The selected AMF may support the UE's requested S-NSSAI(s). For another example, the UE may transmit NAS signaling (e.g., Registration Request message) including the (requested) S-NSSAI(s) to the NW (e.g., AMF, serving cell) via the BS. It is noted that the UE's intended slices may be updated based on the reply from the BS or NW via an RRC message or NAS signaling. The reply may include (but is not limited to) the configured S-NSSAI(s) and allowed S-NSSAI(s).

The UE may provide the UE's intended slices to the NW or be configured with the UE's intended slices by the NW during the initial registration (with the NW via the BS), during the idle-mode (or inactive-mode) mobility, when the UE receives the paging (message), or when Mobile Originated (MO) traffic occurs/arrives. The idle-mode (or inactive-mode) mobility may refer to cell selection, cell reselection, RAN notification area update (RNAU) (e.g., the UE may transmit an RRC message (e.g., RRC resume request message, RRC resume complete message) including the UE's intended slices during (periodic or event-triggered) RNAU to the BS, the UE may receive an RRC message (e.g., RRC resume message, RRC release with/without suspend configuration) including the updated UE's intended slices (e.g., allowed S-NSSAI(s), configured S-NSSAI(s)) from the BS), tracking area update (TAU), etc. It is possible that the BS may determine the updated RNA configuration based on the UE's intended slices and transmit an RRC message (e.g., RRC resume message, RRC release message with/without suspend configuration) including the updated RNA configuration to the UE. In response to the RRC message (e.g., RRC resume request message, RRC resume complete message) transmitted by the UE, the UE may receive the RRC message (e.g., RRC resume message, RRC release message with/without suspend configuration) including the updated RNA configuration and apply the updated RNA configuration. It is possible that in different conditions, the UE's intended slices may refer to different kinds/sets of S-NSSAI(s).

In the case of the initial registration, the UE's intended slices may refer to the (requested) S-NSSAI(s) that the UE transmits to the NW/BS.

In the case of idle-mode mobility, the UE's intended slices may refer to (but not limited to) the allowed S-NSSAI(s) and/or the configured S-NSSAI(s).

In the case of paging reception, the UE's intended slices may refer to (but are not limited to) the allowed S-NSSAI(s), the configured S-NSSAI(s), the S-NSSAI(s) associated with the Mobile Terminated (MT) traffic, or the S-NSSAI(s) associated with the paging cause in the paging downlink control information (DCI) or paging message.

In a case that MO traffic occurs/arrives, the UE's intended slices may refer to (but not limited to) the S-NSSAI(s) associated with the MO traffic.

In a case that the UE is in RRC_INACTIVE state, UE's intended slices may refer to (but not limited to) the S-NSSAI(s) associated with UE's active PDU session when the UE is in RRC_INACTIVE state, or the S-NSSAI(s) associated with the PDU sessions for small data transmission.

Slice Priority Information

The UE may be provided with the information of slice priority for the UE to perform a slice-based cell reselection.

The information of slice priority may include slices (e.g., S-NSSAI(s)) and corresponding priority values. In other words, the slice priority information includes a priority value associated with a slice.

In some examples, the priority value may be a positive integer or may be a positive number.

In some examples, a higher priority value may represent a higher priority. A lower priority value may represent a lower priority.

In some examples, a lower priority value may represent a higher priority. A higher priority value may represent a lower priority.

In some examples, the information of slice priority may include slices in an order of the slices (e.g., from the slice with the highest priority to the slice with the lowest priority, or from the slice with the lower priority to the slice with the highest priority). The information of slice priority may be in a list (or sequence) structure. The information of slice priority may include a list of slices with their priorities in an ascending order or in a descending order.

The UE may be provided with the information of slice priority used for slice-based cell reselection with the following approaches. After the UE (or the AS layer of the UE) is provided with the information of slice priority, the UE (or the AS layer of the UE) may therefore perform slice-based cell reselection based on the information of slice priority.

In some examples, the NAS layer of the UE may provide the AS layer (especially the RRC layer) of the UE with the information of slice priority.

In some examples, the UE may be preconfigured with the information of slice priority.

In some examples, the UE may receive the system information (e.g., System Information Block 1 (SIB1), other SI, slice-specific SIB) or dedicated signaling (e.g., RRC message, NAS signaling) including the information of slice priority from the serving cell.

The system information may include the cell-specific information of slice priority that may be applied by the UE(s) camping on or served by the cell that broadcasts the system information.

The dedicated signaling may include the UE-specific information of slice priority that may be applied by the UE that receives the dedicated signaling from the cell. The UE-specific information of slice priority received via the dedicated signaling may override the cell-specific information of slice priority received via the system information. In other words, the UE may ignore the slice priority information received via the system information (e.g., SIB) when the slice priority information is received via the dedicated signaling (e.g., RRC message). In some examples, the UE may jointly consider the UE-specific information of slice priority received via the dedicated signaling with the cell-specific information of slice priority received via the system information.

In some examples, the UE may receive the NAS signaling including the information of slice priority via the serving cell from the NW. The serving cell may encapsulate the NAS signaling in the dedicated signaling (e.g., RRC message) and transmit the dedicated signaling including the NAS signaling to the UE. The AS layer of the UE may receive the dedicated signaling from the serving cell, retrieve the NAS signaling from the dedicated signaling and forward the NAS signaling to the NAS layer of the UE.

In some examples, if the UE does not receive (or is not configured with) information of slice priority related to UE's intended slice(s), the UE may apply a default slice priority of the UE's intended slice(s).

The default slice priority of the UE's intended slice(s) may be (pre)configured to the UE.

The UE may be configured with the default slice priority after receiving the dedicated signaling (e.g., RRC message, NAS signaling) or system information (e.g., SIB1, other SI, slice-specific SIB).

In some examples, the UE may receive the dedicated signaling or system information including the default slice priority of the UE's intended slice(s) and the UE's corresponding intended slice(s).

In some examples, the UE may receive separate dedicated signaling and system information, where one of the separate dedicated signaling and system information includes the default slice priority of the UE's intended slice(s) and another one of the separate dedicated signaling and system information includes the UE's corresponding intended slice(s).

In some examples, the UE may receive separate sets of dedicated signaling, where one of the separate sets of dedicated signaling includes the default slice priority of the UE's intended slice(s) and another one of the separate sets of dedicated signaling includes the corresponding UE's intended slice(s).

In some examples, the UE may receive separate sets of system information, where one of the separate sets of system information includes the default slice priority of the UE's intended slice(s) and another one of the separate sets of system information includes the UE's corresponding intended slice(s).

The UE may be preconfigured with the default slice priority of the UE's intended slice(s) by the NW or the NAS layer of the UE.

The NAS layer of the UE may forward the default slice priority of the UE's intended slice(s) to the AS layer of the UE.

In some examples, if the UE does not receive information of slice priority related to the UE's intended slice(s), the UE may determine the slice priority of each intended slice based on the value of associated S-NSSAI(s), pre-defined rules, pre-configurations and/or operator's policies, but is not limited thereto.

Frequency Priority Information

The UE may be provided with the information of frequency priority when the UE performs slice-based cell reselection. The information of frequency priority may include (but is not limited to) slices (e.g., S-NSSAI(s)), the frequencies that support the slices, and their corresponding priority values. In other words, the frequency priority information may include a priority value associated with a slice and/or a priority value associated with a frequency.

In some examples, the information of frequency priority may include a per-frequency entity list (e.g., a list of per-frequency entities). A per-frequency entity may include a frequency (e.g., Absolute Radio-Frequency Channel Number (ARFCN) value), slices supported by the frequency, priority values associated with the slices, and/or a priority value associated with the frequency. In this example, the serving cell may determine that the frequencies in the entity list support all UE's intended slices and/or all the supported slices in the NW. The UE receiving the entity list may determine that the frequencies in the entity list support all UE's intended slices. In other words, the frequency priority information may include a per-frequency entity list. Each entity may correspond to a frequency and may include slice(s) that is supported by the frequency and priority value(s) associated with the slice(s).

It should be noted that the priority value may be a positive integer or a positive value.

In some examples, a higher priority value may represent a higher priority. A lower priority value may represent a lower priority.

In some examples, a lower priority value may represent a higher priority. A higher priority value may represent a lower priority.

It is possible that the priority value for each supported frequency may be reused or the same as the legacy cell reselection priority and/or cell reselection sub-priority value for each supported frequency.

In some examples, the information of frequency priority may include a list of frequencies that the serving cell, the neighboring cells, and/or the NW support. A frequency may be indicated by an ARFCN value. The order of the frequencies may indicate the frequency priority. In this example, the serving cell may determine that the frequencies in the list support all UE's intended slices and/or all the supported slices in the NW. The UE receiving such a list may determine that the frequencies in the list support all UE's intended slices.

The order of the frequencies may be presented from the highest priority to the lowest priority (e.g., the frequencies are listed in a descending order in terms of the priority).

The order of the frequencies may be presented from the lowest priority to the highest priority (e.g., the frequencies are listed in an ascending order in terms of the priority).

In some examples, the information of frequency priority may include a per-supported-slice list indicating, for each supported slice, corresponding frequencies that support the supported slice and corresponding priority value for each frequency.

In some examples, for a slice S1, two frequencies f1 and f2 support the slice S1. The priority value for the frequency f1 is 3 and the priority value for the frequency f2 is 2. Meanwhile, for another slice S2, the frequency f1 supports the slice S2. The priority value for the frequency f1 is 1.

It should be noted that the priority value may be a positive integer or a positive value.

In some examples, a higher priority value may represent a higher priority. A lower priority value may represent a lower priority.

In some examples, a lower priority value may represent a higher priority. A higher priority value may represent a lower priority.

In some examples, the number of entities of an entity list in the information of frequency priority may be the number of the slices supported by the serving cell. Each entity is associated with a supported slice and includes the frequencies and corresponding priority values for the supported slice.

In some examples, the information of frequency priority may include a slice list that indicates, for each slice, supported frequencies in an order.

In some examples, for a slice S1, two frequencies f1 and f2 support the slice S1. The priority order may be the frequency f1 and then the frequency f2. Meanwhile, for another slice S2, the frequency f1 supports the slice S2.

For each supported slice, the frequencies that support the slice may be listed from the highest priority to the lowest priority.

For each supported slice, the frequencies that support the slice may be listed from the lowest priority to the highest priority.

The number of entities in the information of frequency priority may be the number of the slices supported by the serving cell. Each entity is associated with a supported slice and includes the frequencies, in order, for the associated slice.

In some examples, the information of frequency priority may include a per-frequency list that indicates, for each supported frequency, a priority value and slices (e.g., S-NSSAI(s)) supported by the frequency.

In some examples, for a frequency f1, two slices S1 and S2 are supported by the frequency f1. Meanwhile, for another frequency f2, the slice S1 is supported by the frequency f2. The priority value of the frequency f1 is 2 and the priority value of the frequency f2 is 3.

It should be noted that the priority value may be a positive integer or a positive value.

In some examples, a higher priority value may represent a higher priority. A lower priority value may represent a lower priority.

In some examples, a lower priority value may represent a higher priority. A higher priority value may represent a lower priority.

The number of entities of an entity list in the information of frequency priority may be the number of the frequencies supported by the serving cell. Each entity is associated with a supported frequency and includes the slices (e.g., S-NSSAI(s)) supported by the associated frequency and corresponding priority value for the associated frequency.

It should be noted that the priority value for each supported frequency may be reused or the same as the legacy cell reselection priority and/or cell reselection sub-priority value for each supported frequency.

In some examples, the information of frequency priority may include a per-frequency list that indicates, for each frequency, supported slices (e.g., S-NSSAI(s)). The order of the per-frequency entities may implicitly indicate the priority.

In some examples, for a frequency f1, two slices S1 and S2 are supported by the frequency f1. Meanwhile, for another frequency f2, the slice S1 is supported by the frequency f2. The entity corresponding to the frequency f1 is followed by the entity corresponding to the frequency f2.

The per-frequency entities may be listed in order from the lowest priority to the highest priority. For example, the priority of the entity corresponding to the frequency f2 is higher than the priority of the entity corresponding to the frequency f1. Alternatively, the per-frequency entities may be listed in order from the highest priority to the lowest priority. For example, the priority of the entity corresponding to the frequency f1 is higher than the priority of the entity corresponding to the frequency f2.

The number of per-frequency entities of the entity list in the information of frequency priority may be the number of the frequencies supported by the serving cell. Each entity is associated with a supported frequency and includes the slices (e.g., S-NSSAI(s)) supported by the associated frequency.

In some examples, the information of frequency priority may include a combination of (at least) one slice and (at least) one frequency that indicates, for each combination (e.g., one or more slices and one or more frequencies that support the slice), there is a corresponding priority value.

In some examples, the combination (S1, f1) may represent that the frequency f1 supports the slice S1, the combination (S2, f1, f2) may represent that the frequencies f1 and f2 support the slice S2, and the combination (S1, S3, f3) may represent that the frequency f3 supports the slices S1 and S3. The priority value for the combination (S1, f1) may be 2, the priority value for the combination (S2, f1, f2) may be 3, and the priority value for the combination (S1, S3, f3) may be 2.5.

It should be noted that the priority value may be a positive integer or a positive value.

In some examples, a higher priority value may represent a higher priority. A lower priority value may represent a lower priority.

In some examples, a lower priority value may represent a higher priority. A higher priority value may represent a lower priority.

The number of entities of an entity list in the information of frequency priority may be the number of the frequencies supported by the serving cell or the number of the slices supported by the serving cell, but is not limited thereto. Each entity may include (at least) one slice and (at least) one frequency that support the (at least) one slice. Each entity may be associated with a priority value, or each entity may further include a priority value.

In some examples, the information of frequency priority may include a combination of (at least) one slice and (at least) one frequency that indicates the order of the combinations. The order of the combinations may implicitly indicate the priority.

In some examples, the combination (S1, f1) may represent that the frequency f1 supports the slice S1, the combination (S2, f1, f2) may represent that the frequencies f1 and f2 support the slice S2, and the combination (S1, S3, f3) may represent that the frequency f3 supports the slices S1 and S3. The information of frequency priority may include the combinations (S1, f1), (S2, f1, f2), and (S1, S3, f3) in order.

The per-frequency entities may be listed in order from the lowest priority to the highest priority. For example, the priority of the combination (S1, S3, f3) is higher than the combination (S2, f1, f2), and the priority of the combination (S2, f1, f2) is higher than the priority of the combination (S1, f1). Alternatively, the per-frequency entities may be listed in order from the highest priority to the lowest priority. For example, the priority of the combination (S1, f1) is higher than the combination (S2, f1, f2), and the priority of the combination (S2, f1, f2) is higher than the priority of the combination (S1, S3, f3).

The number of entities in the information of frequency priority may be the number of the frequencies supported by the serving cell or the number of the slices supported by the serving cell, but is not limited thereto. Each entity may include (at least) one slice and (at least) one frequency that support the (at least) one slice.

The UE may be provided with the information of frequency priority used for slice-based cell reselection with the following approaches. After the UE (or the AS layer of the UE) is provided with the information of frequency priority, the UE (or the AS layer of the UE) may perform slice-based cell reselection based on the information of frequency priority.

In some examples, the UE may be preconfigured with the information of frequency priority.

In some examples, the UE may receive the system information (e.g., SIB1, other SI, slice-specific SIB) or dedicated signaling (e.g., RRC message, RRC Release message with/ without suspend configuration) including the information of frequency priority from the serving cell.

The system information may include the cell-specific information of frequency priority that may be applied by the UE(s) camping on or served by the cell that broadcasts the system information.

The system information may include area-scope information (e.g., associated with the slice-specific SIB) including the information of the frequency priority from the serving RAN (or serving cell) associated with one given system information area ID (e.g., systemInformationAreaID). The UE may further determine whether to apply the information of the frequency priority based on area information (e.g., area-scope information, system information area ID).

The dedicated signaling may include the UE-specific information of frequency priority that may be applied by the UE that receives the dedicated signaling from the cell. The UE-specific information of frequency priority received via the dedicated signaling may override the cell-specific information of frequency priority received via system information. In other words, the UE may ignore the frequency priority information received via the system information (e.g., SIB) when the slice priority information is received via the dedicated signaling (e.g., RRC Release message). In some examples, the UE may jointly consider the UE-specific information of frequency priority received via the dedicated signaling with the cell-specific information of frequency priority received via system information.

The serving cell that delivers/transmits the information of frequency priority may be one E-UTRA cell (e.g., via systeminformationblocktype24) or NR cell (e.g., SIB4). In addition, the proposed slice-based frequency priority/sub-priority information may also be transmitted via RRC messages of E-UTRA protocols and/or RRC messages of NR protocols. An E-UTRA cell is a cell that supports E-UTRA, especially E-UTRA protocols. An NR cell is a cell that supports NR, especially NR protocols.

An NW (e.g., public land mobile network (PLMN), Stand-alone Non-Public Network (SNPN), Public Network Integrated Non-Public Network (PNI-NPN)) may be associated with information of frequency priority. In addition, the cell (or BS) may broadcast the NW identity (e.g., PLMN ID, SNPN ID, PNI-NPN ID) and the associated information of frequency priority via system information (e.g., SIB1, other SI, slice-specific SIB). From the UE's perspective, the UE may select and apply the information of frequency priority based on the registered NW (identity) or selected NW (identity). It should be noted that the upper layer of the UE (e.g., NAS layer of the UE) may determine the selected NW (identity). The upper layer of the UE (e.g., NAS layer of the UE) may determine the registered NW (identity). The upper layer of the UE (e.g., NAS layer of the UE) may transmit the selected NW identity to the NW via the RRC layer of the UE and the serving/camped cell for the registration. After the registration, the UE may determine the selected NW identity as the registered NW identity.

In some examples, if the UE does not receive information of frequency priority related to UE's intended slice(s), the UE may apply a default frequency priority of the UE's intended slice(s).

The default frequency priority of the UE's intended slice(s) may be (pre)configured to the UE.

The UE may be configured with the default frequency priority after receiving the dedicated signaling (e.g., RRC message, NAS signaling) or system information (e.g., SIB1, other SI, slice-specific SIB).

The UE may receive the dedicated signaling or system information including the default frequency priority of the UE's intended slice(s) and the UE's corresponding intended slice(s).

The UE may receive separate dedicated signaling and system information, where one of the separate dedicated signaling and system information includes the default frequency priority of the UE's intended slice(s) and another one of the separate dedicated signaling and system information includes the corresponding UE's intended slice(s).

The UE may receive separate sets of dedicated signaling, where one of the separate sets of dedicated signaling may include the default frequency priority of the UE's intended slice(s) and another one of the separate sets of dedicated signaling may include the UE's corresponding intended slice(s).

The UE may receive separate sets of system information, where one of the separate sets of system information may include the default frequency priority of the UE's intended slice(s) and another one of the separate sets of system information may include the UE's corresponding intended slice(s).

The UE may be preconfigured with the default frequency priority of the UE's intended slice(s) by the NW or the NAS layer of the UE.

The NAS layer of the UE may forward the default frequency priority of the UE's intended slice(s) to the AS layer of the UE.

In some examples, if the UE does not receive information of frequency priority related to UE's intended slice(s), the UE may determine the frequency priority of each UE's intended slice based on the value of associated S-NSSAI(s), pre-defined rules, pre-configurations and/or operators polices, but is not limited thereto.

Slice Information of the Serving Cell

The UE may be provided with the slice information of the serving cell by the serving cell, and thus performs a slice-based cell reselection. The slice information of the serving cell may include at least the slices and/or slice groups that are supported by the serving cell.

In some examples, the slices may be indicated by S-NSSAI(s). The slice groups may be indicated by S-NSSAI(s), Slice Service Type(s) (SST(s)), or Slice Differentiator(s) (SD(s)). For example, slice(s) in the same slice group may be associated with the same slice information, the same priority information, and/or the same frequency information (but is not limited thereto).

The UE may receive the slice information of the serving cell with the following approaches.

The UE may receive the system information (e.g., SIB1, SIB2, SIB3, SIB4, SIB5, slice-specific SIB) including the slice information of the serving cell from the serving cell. The slice information of the serving cell received in the system information may be common for UEs that receive the system information from the serving cell. After the UE receives the system information including the slice information of the serving cell, the UE may store the slice information of the serving cell.

In some examples, the UE may store the cell-specific slice information of the serving cell for a period of time. The time period may be a predefined value or may be configured by the serving cell. After the period of time, the UE may release the cell-specific slice information of the serving cell. It is noted that the design of the period of time for the validity of the cell-specific slice information of the serving cell may be applicable to area-specific slice information (e.g., the area associated with one system information area ID, the slice information applicable for a specific area) of the serving cell. After releasing the slice information of the serving cell or area-specific slice information of the serving cell, the UE may re-acquire the slice information.

In some examples, after the UE camps on a target cell or hands over to a target cell, the UE may release the cell-specific slice information of the (source) serving cell.

In some examples, when the UE has stored the cell-specific slice information of the serving cell received via the system information, the UE may not replace the cell-specific slice information of the serving cell with the UE-specific slice information of the serving cell received via the dedicated signaling in a case that the UE receives the UE-specific slice information of the serving cell via the dedicated signaling from the serving cell.

In some examples, when the UE has stored the cell-specific slice information of the serving cell received via the system information, the UE may replace the cell-specific slice information of the serving cell with the UE-specific slice information of the serving cell received via the dedicated signaling in a cast that the UE receives the UE-specific slice information of the serving cell via the dedicated signaling from the serving cell.

In some examples, when the UE has stored the cell-specific slice information of the serving cell received via the system information, the UE may replace the cell-specific slice information of the serving cell with a newly received cell-specific slice information of the serving cell received via the system information in a cast that the UE receives the new cell-specific slice information of the serving cell via the system information from the serving cell.

The UE may receive the dedicated signaling (e.g., RRC message, RRC Release message with/without suspend configuration) including the slice information of the serving cell from the serving cell. The slice information of the serving cell received in the dedicated signaling may be UE-specific for the UE that receives the dedicated signaling. After the UE receives the dedicated signaling including the slice information of the serving cell, the UE may store the UE-specific slice information of the serving cell.

In some examples, the UE may store the UE-specific slice information of the serving cell for a period of time. The time period may be a predefined value or may be configured by the serving cell. After the period of time, the UE may release the UE-specific slice information of the serving cell.

In some examples, after the UE camps on a target cell or hands over to a target cell, the UE may release the UE-specific slice information of the (source) serving cell.

In some examples, when the UE has stored the UE-specific slice information of the serving cell received via the dedicated signaling, the UE may not replace the UE-specific slice information of the serving cell with the cell-specific slice information of the serving cell received via the system information in a case that the UE receives the cell-specific slice information of the serving cell via the system information from the serving cell.

In some examples, when the UE has stored the UE-specific slice information of the serving cell received via the dedicated signaling, the UE may replace the UE-specific slice information of the serving cell with the cell-specific slice information of the serving cell received via the system information in a case that the UE receives the cell-specific slice information of the serving cell via the system information from the serving cell.

In some examples, when the UE has stored the UE-specific slice information of the serving cell received via the dedicated signaling, the UE may replace the UE-specific slice information of the serving cell with a newly received UE-specific slice information of the serving cell received via the dedicated signaling in a case that the UE receives the new UE-specific slice information of the serving cell via the dedicated signaling from the serving cell.

In some examples, the slice information of the serving cell may be included in the information of frequency priority (e.g., frequency priority information) provided by the serving cell to the UE. In some examples, the slice information of the serving cell may be independent of the information of the frequency priority provided by the serving cell to the UE. That is, the slice information of the serving cell and the information of the frequency priority may be separate information element (IE) provided by the serving cell to the UE.

Slice Information of the Neighboring Cells

The UE may be provided with the slice information of the neighboring cells by the serving cell, and thus performs a slice-based cell reselection. The slice information of the neighboring cell may include at least the slices and/or slice groups supported by the neighboring cells.

In some examples, the slices may be indicated by S-NSSAI(s). The slice groups may be indicated by S-NSSAI(s), SST(s), and/or SD(s). For example, slice(s) in the same slice group may be associated with the same slice information of the neighboring cells.

The slice information of the neighboring cells may include a per-neighboring-cell list. The per-neighboring-cell list may be a list of neighboring-cell-specific entities. Each neighboring-cell-specific entity may include a cell identity (e.g., physical cell identity, global unique cell identity) and the associated slices and/or slice groups supported by the neighboring cell identified by the cell identity.

The slice information of the neighboring cells may include slices and/or slice groups that are commonly supported by the neighboring cells.

The slice information of the neighboring cells may include two IEs: one IE may include at least one cell identity (e.g., physical cell identity, global unique cell identity) that identifies the neighboring cells; and the other IE may include at least one slice and/or slice group supported by the neighboring cells.

The UE may receive the slice information of the neighboring cells with the following approaches.

The UE may receive the system information (e.g., SIB1, SIB2, SIB3, SIB4, SIB5, slice-specific SIB) including the slice information of the neighboring cells from the serving cell. The slice information of the neighboring cells received in the system information may be common for UEs that receive the system information from the serving cell. After the UE receives the system information including the slice information of the neighboring cells, the UE may store the slice information of the neighboring cells.

In some examples, the UE may store the cell-specific slice information of the neighboring cells for a period of time. The time period may be a predefined value or may be configured by the serving cell. After the period of time, the UE may release the cell-specific slice information of the neighboring cells. It is noted that the design of the period of time for the validity of the cell-specific slice information of the neighboring cells may be applicable to area-specific slice information (e.g., the area associated with one system information area ID, the slice information applicable for a specific area). After releasing the cell-specific slice information of the neighboring cells or area-specific slice information of the neighboring cells, the UE may re-acquire the slice information.

In some examples, after the UE camps on a target cell or hands over to a target cell, the UE may release the cell-specific slice information of the neighboring cells provided by the (source) serving cell.

In some examples, when the UE has stored the cell-specific slice information of the neighboring cells received via the system information, the UE may not replace the cell-specific slice information of the neighboring cells with the UE-specific slice information of the neighboring cells received via the dedicated signaling in a case that the UE receives the UE-specific slice information of the neighboring cells via the dedicated signaling from the serving cell.

In some examples, when the UE has stored the cell-specific slice information of the neighboring cells received via the system information, the UE may replace the cell-specific slice information of the neighboring cells with the UE-specific slice information of the neighboring cells received via the dedicated signaling in a case that the UE receives the UE-specific slice information of the neighboring cells via the dedicated signaling from the serving cell.

In some examples, when the UE has stored the cell-specific slice information of the neighboring cells received via the system information, the UE may replace the cell-specific slice information of the neighboring cells with a newly received cell-specific slice information of the neighboring cells received via the system information in a case that the UE receives the new cell-specific slice information of the neighboring cells via the system information from the serving cell.

The UE may receive the dedicated signaling (e.g., RRC message, RRC Release message with/without suspend configuration) including the slice information of the neighboring cells from the serving cell. The slice information of the neighboring cells received in the dedicated signaling may be UE-specific for the UE that receives the dedicated signaling. After the UE receives the dedicated signaling including the slice information of the neighboring cells, the UE may store the UE-specific slice information of the neighboring cells.

In some examples, the UE may store the UE-specific slice information of the neighboring cells for a period of time. The time period may be a predefined value or may be configured by the serving cell. After the period of time, the UE may release the UE-specific slice information of the neighboring cells.

In some examples, after the UE camps on a target cell or hands over to a target cell, the UE may release the UE-specific slice information of the neighboring cells provided by the (source) serving cell.

In some examples, when the UE has stored the UE-specific slice information of the neighboring cells received via the dedicated signaling, the UE may not replace the UE-specific slice information of the neighboring cells with the cell-specific slice information of the neighboring cells received via the system information in a case that the UE receives the cell-specific slice information of the neighboring cells via the system information from the serving cell.

In some examples, when the UE has stored the UE-specific slice information of the neighboring cells received via the dedicated signaling, the UE may replace the UE-specific slice information of the neighboring cells with the cell-specific slice information of the neighboring cells received via the system information in a case that the UE receives the cell-specific slice information of the neighboring cells via the system information from the serving cell.

In some examples, when the UE has stored the UE-specific slice information of the neighboring cells received via the dedicated signaling, the UE may replace the UE-specific slice information of the neighboring cells with a newly received UE-specific slice information of the neighboring cells received via the dedicated signaling in a case that the UE receives the new UE-specific slice information of the neighboring cells via the dedicated signaling from the serving cell.

In some examples, the slice information of the neighboring cells may be included in the information of frequency priority (e.g., frequency priority information) provided by the serving cell to the UE. In some examples, the slice information of the neighboring cells may be independent of the information of the frequency priority provided by the serving cell to the UE. That is, the slice information of the neighboring cells and the information of the frequency priority may be separate IEs provided by the serving cell to the UE.

An NW (e.g., PLMN, SNPN, PNI-NPN) may be associated with slice information of the neighboring cells. In addition, the cell (or BS) may broadcast the NW identity (e.g., PLMN ID, SNPN ID, PNI-NPN ID) and the associated slice information of the neighboring cells via system information (e.g., SIB1, other SI, slice-specific SIB). From the UE's perspective, the UE may select and apply the slice information of the neighboring cells based on the registered NW (identity) or selected NW (identity). It should be noted that the upper layer of the UE (e.g., NAS layer of the UE) may determine the selected NW (identity). The upper layer of the UE (e.g., NAS layer of the UE) may determine the registered NW (identity). The upper layer of the UE (e.g., NAS layer of the UE) may transmit the selected NW identity to the NW via the RRC layer of the UE and the serving/camped cell for the registration. After the registration, the UE may determine the selected NW identity as the registered NW identity.

The Outcome of the Slice-Based Cell Reselection

The outcome of the slice-based cell reselection may include, but is not limited to:

1. The UE (re)selects a suitable cell;
2. The UE (re)selects an acceptable cell; and
3. The UE continues to perform the slice-based cell reselection.

The suitable cell (re)selected by the UE via the slice-based cell reselection may include any combination of the following features:

1. The suitable cell may support all the UE's intended slices.
2. The suitable cell may support the UE's default slice that belongs to the UE's intended slices.
3. The suitable cell may support at least one of the UE's intended slices.
4. The suitable cell may support a default slice that does not belong to the UE's intended slices.
5. The suitable cell may support the UE's selected slice for slice-based cell reselection.
6. The suitable cell may satisfy the cell selection criteria.
7. The cell is not barred (e.g., according to the latest information provided by the NAS layer of the UE (to the AS layer of the UE)).
8. The cell is part of at least one Tracking Area (TA) that is not part of the list of Forbidden Tracking Areas, which belongs to a PLMN selected by the UE (e.g., UE's selected PLMN), a PLMN registered by the UE (e.g., UE's registered PLMN), or a PLMN of the Equivalent PLMN list (e.g., according to the latest information provided by the NAS layer of the UE (to the AS layer of the UE)).
9. For a UE not operating in the SNPN Access Mode (AM), the suitable cell is part of the UE's selected PLMN, the UE's registered PLMN, or a PLMN of the Equivalent PLMN list, and for that PLMN either: (1) the PLMN ID of that PLMN is broadcast by the cell with no associated CAG ID(s) and the CAG-only indication in the UE for that PLMN is absent or false, or (2) an allowed CAG list in the UE for that PLMN includes a CAG ID broadcast by the cell for that PLMN.
10. For a UE operating in the SNPN AM, the suitable cell is part of either the UE's selected SNPN or the UE's registered SNPN.

The acceptable cell (re)selected by the UE via the slice-based cell reselection may include any combination of the following features, but is not limited thereto:

1. The acceptable cell may not support any slices;
2. The acceptable cell may not support any of the UE's intended slices;
3. The acceptable cell may support a default slice that does not belong to the UE's intended slices;
4. The acceptable cell may not support the UE's selected slice;
5. The acceptable cell may satisfy the cell selection criteria;
6. The acceptable cell may not be barred; and/or
7. The acceptable cell may provide the UE with the limited service (e.g., the UE may originate emergency calls to the acceptable cell and/or receive Earthquake and Tsunami Warning System (ETWS) and Commercial Mobile Alert System (CMAS) notifications from the acceptable cell).

In this disclosure, the UE that performs the slice-based cell reselection may be configured/provided with any combination of the following information, but is not limited thereto:

1. Slice priority;
2. Frequency priority;
3. Slice information of the serving cell; and/or
4. Slice information of the neighboring cells.

The UE may perform the slice-based cell reselection based on slice priority, frequency priority, slice information of the serving cell, and/or the slice information of the neighboring cells.

Slice-Based Cell Reselection: Slice Priority Approach

FIG. 1 is a flowchart illustrating a slice-based cell reselection with slice priority, according to an implementation of the present disclosure. In step 102, the UE is configured/provided with the slice priority (e.g., by the previously mentioned slice priority information). For example, the slice priority information may indicate a slice list including the slices S1, S2, and S3. Slice S1 may be assumed to have the highest slice priority, while slice S2 may be assumed to have the middle slice priority, and slice S3 to have the lowest slice priority. FIG. 1 illustrates that the slice priority S1>S2>S3. In step 104, the UE may perform the slice-based cell (re)selection based on the assumed slice priorities (e.g., slice priority S1>S2>S3 as shown in FIG. 1). For example, the UE may select slice S1 before the other two slices. In step 106, the UE may (re)select a suitable cell or an acceptable cell. The suitable cell or the acceptable cell may support the selected slice S1.

Figure 2:
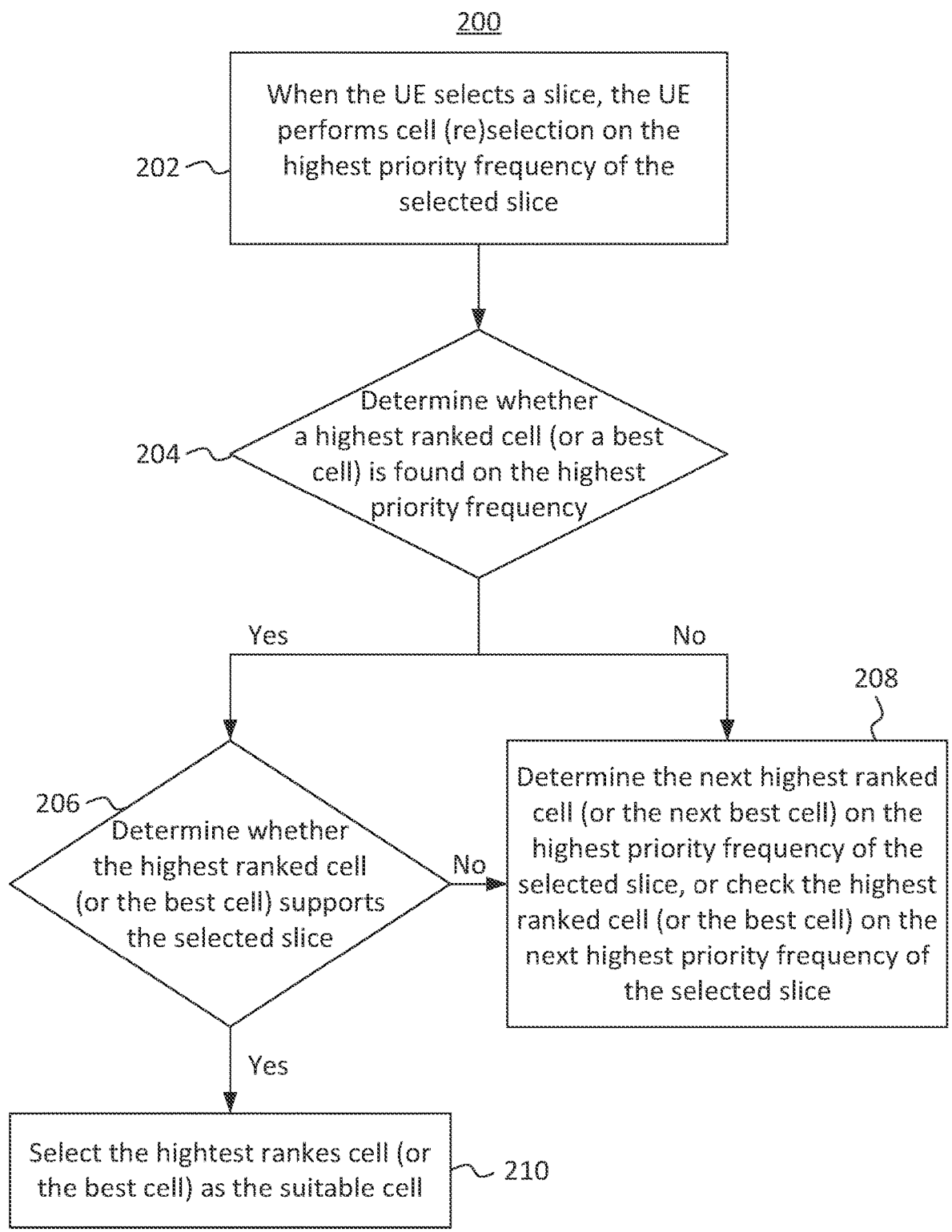
FIG. 2 is a flowchart illustrating a slice-based cell reselection, according to an implementation of the present disclosure.

FIG. 2 is a flowchart illustrating a slice-based cell reselection, according to an implementation of the present disclosure. In step 202, when the UE selects a slice having the highest slice priority (e.g., by a priority value in the previously mentioned slice priority information), the UE may perform cell selection on the highest priority frequency of the selected slice. It should be noted that the UE is configured/provided with the frequency priority by the previously mentioned frequency priority information. In step 204, the UE may determine whether a highest ranked cell (or a best cell) is found on the highest priority frequency in the previously mentioned slice priority information. In step 206, the UE may further determine whether the highest ranked cell (or the best cell) supports the selected slice when the UE determines that the highest ranked cell (or a best cell) is found on the highest priority frequency. In step 208, the UE may determine the next highest ranked cell (or the next best cell) on the highest priority frequency of the selected slice or determine the highest ranked cell (or the best cell) on the next highest priority frequency of the selected slice when the UE determines that the highest ranked cell (or a best cell) is not found on the highest priority frequency or when the UE determines the highest ranked cell (or the best cell) does not support the selected slice. In step 210, the UE may select the highest ranked cell (or the best cell) as the suitable cell when the UE determines the highest ranked cell (or the best cell) supports the selected slice.

It should be noted that when the UE determines the highest ranked cell (or the best cell) does not support the selected slice, the UE may reselect another slice (e.g., the next highest slice priority in the slice priority information) or remain with the (re)selected slice (e.g., the highest slice priority in the slice priority information). Moreover, the UE may determine reselection priorities for the frequencies indicated in the frequency priority information based on the reselected slice, slice priorities in the slice priority information and the frequency priorities in the frequency priority information, so as to find a cell/frequency that supports the reselected slice. Thus, the UE may perform the slice-based cell reselection to find the (next) highest ranked cell (or the (next) best cell) on the highest priority frequency of the reselected slice according to the determined reselection priorities.

The reselection priorities for the frequencies indicated in the frequency priority information are used for finding a frequency that supports the reselected slice. The UE may determine a reselection priority for the frequency that supports the reselected slice according to a slice priority (e.g., priority value in the frequency priority information) associated with the reselected slice. For example, the UE reselects a slice S1, and two frequencies f1 and f2 support the slice S1. For the frequency f1, the priority value associated with the slice S1 in the frequency priority information is '2'. For the frequency f2, the priority value associated with the slice S1 in the frequency priority information is '3'. Thus, the UE may determine the reselection priority for the frequency f1 as '2' and the reselection priority for the frequency f2 as '3'.

In some examples, the UE may determine a reselection priority for a frequency that does not support the reselected slice or does not support a slice indicated in the slice priority information according to the corresponding frequency priority indicated in the frequency priority information. It should be noted that the reselection priority for a frequency that supports the reselected slice is higher than the reselection priority for a frequency that does not support the reselected slice or does not support a slice indicated in the slice priority information, so as to assist the UE in finding the frequency/cell that supports the reselected slice by the slice-based cell reselection with slice priority.

Generally, there may be a tradeoff between whether the slice(s) supported by a (re)select cell is the most favored by the UE and whether the signal quality/strength of the (re) selected cell is the best. The slice priority approach may target enabling the UE to (re)select a cell that supports the UE's most favorable slice and has the best/strongest signal quality/strength among all the cells on a frequency. However, if the target goal cannot be achieved, the slice priority approach can at least enable the UE to (re)select a cell that supports the UE's intended slices or the default slice and the signal quality/strength of (re)selected cell is satisfactory to the UE. The time complexity, UE complexity, and signaling overhead of the slice priority approach should be affordable.

Slice Selection

The UE may select a slice to perform the slice-based cell reselection with slice priority approach. The UE may select a slice in several methods.

For example, the UE may select a slice based on the slice priority that is indicated in the slice priority information.

The selected slice may be configured with the highest slice priority (in the UE's intended slices).

The selected slice may be configured with the lowest slice priority (in the UE's intended slices).

The selected slice may be configured with the highest slice priority (in the UE's intended slices that have not yet been selected in the slice-based cell reselection).

The selected slice may be configured with the lowest slice priority (in the UE's intended slices that have not yet been selected in the slice-based cell reselection).

The selected slice may be a default slice.

A default slice (e.g., eMBB slice) may be predefined.

A default slice may be configured/provided by the NW via the serving cell to the UE.

A default slice may be determined by each UE (e.g., by the NAS layer of the UE).

The selected slice may be randomly selected by the UE from the UE's intended slices.

The criteria to select the selected slice may be different or the same in different conditions.

In some examples, in the slice-based cell reselection, when the UE has not yet found any unsatisfactory cell, the UE may select the slice based on the slice priority. However, in the slice-based cell reselection, when the UE has found an unsatisfactory cell, the UE may then select the slice randomly among UE's intended slices.

In some examples, in the slice-based cell reselection, when the UE has found an unsatisfactory cell which is not a suitable cell, the UE may then iteratively perform the slice-based cell reselection based on another selected slice. Another selected slice is randomly selected by the UE among UE's intended slices.

In some examples, in the slice-based cell reselection, when the UE has not yet found any unsatisfactory cell, the UE may select the slice with the highest slice priority. However, in the slice-based cell reselection, when the UE has found an unsatisfactory cell, the UE may then select the slice with the next highest slice priority.

An unsatisfactory cell may be a cell that cannot meet certain requirements. For example, an unsatisfactory cell is not a suitable cell, an unsatisfactory cell is not an acceptable cell, an unsatisfactory cell is barred, and/or an unsatisfactory cell cannot fulfill the requirements in the slice-based cell reselection with slice priority.

Details for the UE performing the slice-based cell reselection are disclosed as follows.

After the UE selects a slice, the UE may further determine the priorities of the frequencies that support the selected slice. The UE may determine the priorities of the frequencies based on the information of the frequency priority (e.g., the previously mentioned frequency priority information) if the UE is configured/provided with the slice information of the serving cell (e.g., indicated in the frequency priority information) and/or the slice information of the neighboring cells (e.g., indicated in the frequency priority information). Generally, the UE may determine the highest priority frequency that supports the selected slice. If the UE is not configured/provided with the frequency priority for that selected slice, the UE may determine that the frequency that the UE is currently operating on as the highest priority frequency. If the UE is not configured/provided with the frequency priority for that selected slice, the UE may apply the default frequency priority for that selected slice. After the priorities of the frequencies are determined by the UE, the UE may perform the cell search (e.g., cell measurement) on the highest priority frequency.

The UE may (re)select a frequency based on the information of the frequency priority if the UE is configured/provided with the slice information of the serving cell and/or the slice information of the neighboring cells.

If the UE is not configured/provided with the information of the frequency priority, the UE may transmit an RRC message (e.g., RRC System Information Request message) to request the information of the frequency priority from the serving cell.

If the UE is not configured/provided with the slice information of the serving cell, the UE may transmit an RRC message (e.g., RRC System Information Request message) to request the slice information of the serving cell from the serving cell.

If the UE is not configured/provided with the slice information of the neighboring cells, the UE may transmit an RRC message (e.g., RRC System Information Request message) to request the slice information of the neighboring cells from the serving cell.

If the UE is not configured/provided with the information of the frequency priority, the UE may apply the default configuration/value/setting of the frequency priority from the serving cell.

If the UE is not configured/provided with the slice information of the serving cell, the UE may apply the default configuration/value/setting of the slice information of the serving cell.

If the UE is not configured/provided with the slice information of the neighboring cells, the UE may apply the default configuration/value/setting of the slice information of the neighboring cells.

During the cell search (e.g., cell measurement) on the highest priority frequency, the UE may determine whether the highest ranked cell or the best cell can be found on the highest priority frequency. It should be noted that the UE may determine the highest ranked cell based on the R criteria in 3GPP Technical Specification (TS) 38.304 v16.1.0. In some examples, the best cell may be the cell with the strongest signal strength or signal quality on the frequency.

After the UE determines that the highest ranked cell or a best cell is found on the highest priority frequency, the UE may further determine whether the highest ranked cell or the best cell supports the selected slice. However, the highest ranked cell or the best cell may or may not support the selected slice.

In some examples, when the highest priority frequency is a licensed frequency and when all cells in the same Tracking Area (TA) or in the same Registration Area (RA) support the same slices, the UE may determine that the highest ranked cell or the best cell supports the selected slice.

In some examples, (1) when the highest priority frequency is an unlicensed frequency, (2) when the highest priority frequency is a licensed frequency and when all cells in the same TA or in the same RA support the same slices, and/or (3) when the highest priority frequency is a licensed frequency, but when all cells in the same TA or in the same RA may not support the same slices, the UE may determine that the highest ranked cell or the best cell does not support the selected slice.

After the UE determines that the highest ranked cell or the best cell on the highest priority frequency supports the selected slice and is suitable, the UE may select the highest ranked cell or the best cell as the outcome of the slice-based cell reselection.

After the UE determines that the highest ranked cell or the best cell on the highest priority frequency supports the selected slice and is acceptable, the UE may select the highest ranked cell or the best cell as the outcome of the slice-based cell reselection.

However, the UE may continue to perform the slice-based cell reselection when some conditions occur.

In some examples, after the UE determines that a highest ranked cell or a best cell cannot be found on the highest priority frequency, the UE may continue to perform the slice-based cell reselection.

In some examples, after the UE determines that the highest ranked cell or the best cell found on the highest priority frequency is not suitable, the UE may continue to perform the slice-based cell reselection.

In some examples, after the UE determines that the highest ranked cell or the best cell found on the highest priority frequency is neither suitable nor acceptable, the UE may continue to perform the slice-based cell reselection.

In some examples, after the UE determines that the highest ranked cell or the best cell found on the highest priority frequency does not support the selected slice, the UE may continue to perform the slice-based cell reselection.

The UE may determine to perform the legacy cell reselection (e.g., cell reselection without considering slice information, such as in 3 GPP TS 38.304 v16.1.0) and/or enter the "any cell selection" sub-state when some conditions occur. When the UE enters the any cell selection sub-state, the UE may continue to perform the legacy cell reselection or slice-based cell reselection. If the UE determines to perform the legacy cell reselection, the UE may target reselecting a suitable cell or an acceptable cell in the any cell selection sub-state. If the UE determines to perform the slice-based cell reselection, the UE may target reselecting a suitable cell that supports the UE's intended slices, a suitable cell that may not support the UE's intended slices, an acceptable cell that supports the UE's intended slices or an acceptable cell that may not support the UE's intended slices.

In some examples, after the UE determines that the highest ranked cell or the best cell cannot be found on the highest priority frequency, the UE may perform the legacy cell reselection and/or enter the any cell selection sub-state.

In some examples, after the UE determines that the highest ranked cell or the best cell found on the highest priority frequency is not suitable, the UE may perform the legacy cell reselection and/or enter the any cell selection sub-state.

In some examples, after the UE determines that the highest ranked cell or the best cell found on the highest priority frequency is neither suitable nor acceptable, the UE may perform the legacy cell reselection and/or enter the any cell selection sub-state.

In some examples, after the UE determines that the highest ranked cell or the best cell found on the highest priority frequency does not support the selected slice, the UE may perform the legacy cell reselection and/or enter the any cell selection sub-state.

When the UE enters the any cell selection sub-state, the UE may perform the legacy cell reselection and/or the slice-based cell reselection targeting selecting a suitable cell or an acceptable cell.

Generally, the highest priority frequency may refer to a first frequency. The highest ranked cell or the best cell on the highest priority frequency may refer to a first cell. Moreover, details about how the UE continues to perform the slice-based cell reselection based on a next (or second) cell and/or a next (or second) frequency are disclosed.

UE Behavior after Determining to Continue to Perform the Slice-Based Cell Reselection If the UE continues to perform the slice-based cell reselection (e.g., when a first cell is determined to be not qualified to be selected as the outcome of the slice-based cell reselection), the UE may determine a next (or second) cell and then further determine if such next cell satisfies or qualifies as the outcome of the slice-based cell reselection. Several examples are disclosed for the UE to determine a next (or second) cell.

In some examples, the UE may further determine to apply a same-frequency based cell reselection or a next-frequency based cell reselection, and then perform the corresponding slice-based cell reselection.

It should be noted that the first cell and the next (or second) cell are on the same frequency if the UE applies the same-frequency based cell reselection.

It should be noted that the first cell and the next (or second) cell are on different frequencies if the UE applies the next-frequency based cell reselection. In some examples, the frequency where the first cell operates has higher priority than the frequency where the second cell operates.

In some examples, the UE may perform the same-frequency based cell reselection rather than the next-frequency based cell reselection.

In some examples, the UE may perform the next-frequency based cell reselection rather than the same-frequency based cell reselection.

In some examples, when the UE determines to perform the same-frequency based cell reselection, the UE may determine the next (or second) highest ranked cell or the next (or second) best cell on the first frequency (e.g., the highest priority frequency) as the next (or second) cell.

The next (or second) highest ranked cell may refer to a cell with its rank (based on R criterion in 3GPP TS 38.304 v16.1.0) following the rank of the highest ranked cell.

The next (or second) highest ranked cell may refer to a cell with its rank (based on R criterion in 3GPP TS 38.304 v16.1.0) following the rank of the highest ranked cell. Moreover, the rank of the next (or second) highest ranked cell should be higher than or equal to a rank threshold. The rank threshold is predefined or configured by the serving cell to the UE (e.g., via system information, via dedicated signaling).

The next (or second) highest ranked cell may refer to a cell with its rank (based on R criterion in 3GPP TS 38.304 v16.1.0) following the rank of the highest ranked cell. Moreover, the signal quality/strength of the next (or second) highest ranked cell should be higher than or equal to a signal quality/strength threshold. The signal quality/strength threshold is predefined or configured by the serving cell to the UE (e.g., via system information, via dedicated signaling).

The next (or second) best cell may refer to a cell with its signal quality/strength following or next to the signal quality/strength of the best cell.

The next (or second) best cell may refer to a cell with its signal quality/strength following the signal quality/strength of the best cell. Furthermore, the signal quality/strength of the next (or second) best cell should be higher than or equal to a signal quality/strength threshold. The signal quality/strength threshold is predefined or configured by the serving cell to the UE (e.g., via system information, via dedicated signaling).

The next (or second) best cell may refer to a cell with its signal quality/strength following the signal quality/strength of the best cell. Furthermore, the rank of the next (or second) best cell should be higher than or equal to a rank threshold. The rank threshold is predefined or configured by the serving cell to the UE (e.g., via system information, via dedicated signaling).

If the UE cannot determine a next (or second) cell (e.g., a next (or second) highest ranked cell or a next (or second) best cell) in the same-frequency based cell reselection (e.g., if the first cell operates on the highest priority frequency, the next (or second) cell should be determined on the highest priority frequency), the UE may determine whether a next (or second) frequency (e.g., a next (or second) highest priority frequency) of the selected slice exists.

If the UE determines a next (or second) highest priority frequency of the selected slice, the UE may perform the next-frequency based cell reselection.

If the UE cannot determine a next (or second) cell (e.g., a next (or second) highest ranked cell or a next (or second) best cell) in the same-frequency based cell reselection (e.g., if the first cell operates on the highest priority frequency, the next (or second) cell should be determined on the highest priority frequency), the UE may reselect a slice. The rule that the UE reselects a slice may be the same as or different from the rule that the UE selects a slice. The reselected slice may be the same as or different from the selected slice. After the UE reselects a slice, the UE may perform the slice-based cell reselection, same-frequency based cell reselection, and/or next-frequency based cell reselection.

If the UE cannot determine a next (or second) cell (e.g., a next (or second) highest ranked cell or a next (or second) best cell) in the same-frequency based cell reselection (e.g., if the first cell operates on the highest priority frequency, the next (or second) cell should be determined on the highest priority frequency), the UE may enter the cell reselection sub-state.

In the cell reselection sub-state, the UE may continue to perform the legacy cell reselection or slice-based cell reselection for a suitable cell or an acceptable cell.

In some examples, the UE may select the next (or second) cell as the outcome of the slice-based cell reselection.

In some examples, after the UE determines that the next (or second) cell on the frequency supports the selected slice and is suitable, the UE may select the next (or second) cell as the outcome of the slice-based cell reselection.

In some examples, after the UE determines that the next (or second) cell on the frequency supports the selected slice and is acceptable, the UE may select the next (or second) cell as the outcome of the slice-based cell reselection.

In some examples, after the UE determines that the next (or second) cell on the frequency supports the selected slice, the UE may select the next (or second) cell as the outcome of the slice-based cell reselection.

In some examples, after the UE determines that the next (or second) cell on the frequency is suitable, the UE may select the next (or second) cell as the outcome of the slice-based cell reselection.

In some examples, after the UE determines that the next (or second) cell on the frequency is acceptable, the UE may select the next (or second) cell as the outcome of the slice-based cell reselection.

In some examples, the UE may not select the next (or second) cell as the outcome of the slice-based cell reselection.

In some examples, after the UE determines that the next (or second) cell on the frequency does not support the selected slice, the UE may not select the next (or second) cell as the outcome of the slice-based cell reselection.

In some examples, after the UE determines that the next (or second) cell on the frequency supports the selected slice, but is not suitable, the UE may not select the next (or second) cell as the outcome of the slice-based cell reselection.

In some examples, after the UE determines that the next (or second) cell on the frequency supports the selected slice, but is not acceptable, the UE may not select the next (or second) cell as the outcome of the slice-based cell reselection.

In some examples, after the UE determines that the next (or second) cell on the frequency is not suitable, the UE may not select the next (or second) cell as the outcome of the slice-based cell reselection.

In some examples, after the UE determines that the next (or second) cell on the frequency is not acceptable, the UE may not select the next (or second) cell as the outcome of the slice-based cell reselection.

If the UE determines not to select the next (or second) cell as the outcome of the slice-based cell reselection, the UE may perform one or more of the following actions:

1. Continue to perform the same-frequency based cell reselection;
2. Continue to perform the next-frequency based cell reselection;
3. Continue to perform the legacy cell reselection;
4. Lower the priority of the frequency where the next (or second) cell operates;
5. Lower the priority of the frequency where the next (or second) cell operates, if the number of cell reselection attempts (e.g., the number of unsatisfactory cells, the number of (the next or second) cells that the UE tries) on the frequency exceeds a pre-configured threshold value;
6. Lower the priority of the frequency where the next (or second) cell operates for a period of time (e.g., 300s); and/or
7. Enter a cell selection sub-state.

If the UE determines not to select the next (or second) cell as the outcome of the slice-based cell reselection, the UE may further determine whether the number of cells that the UE has considered in the slice-based cell reselection, in the same-frequency based cell reselection, and/or in the next-frequency based cell reselection is greater than or equal to a value. The value is predefined or configured by the serving cell to the UE (e.g., via system information, via dedicated signaling).

In some examples, if the value is 2, and the UE has already considered 2 cells in the slice-based cell reselection, but the 2 cells still do not meet the requirements to be selected as the outcome of the slice-based cell reselection, the UE may stop performing the slice-based cell reselection, same-frequency based cell reselection, and/or next-frequency based cell reselection for a period of time. The period of time may be predefined (e.g., 300s) or be configured/provided by the serving cell to the UE.

In some examples, if the value is 2, and the UE has considered 2 cells in the slice-based cell reselection, in the same-frequency based cell reselection, and/or in the next-frequency based cell reselection, but the 2 cells still do not meet the requirements to be selected as the outcome of the slice-based cell reselection, the UE may enter the cell selection sub-state.

In some examples, if the value is 2, and the UE has considered 2 cells in the same-frequency based cell reselection, but the 2 cells still do not meet the requirements to be selected as the outcome of the slice-based cell reselection, the UE may lower the priority of the frequency (e.g., to the lowest frequency priority) where the 2 cells operate for a period of time. The period of time may be predefined (e.g., 300s) or be configured/provided by the serving cell to the UE. Afterwards, the UE may or may not continue to perform the next-frequency based cell reselection.

In some examples, if the value is 2, and the UE has considered 2 cells in the same-frequency based cell reselection, but the 2 cells still do not meet the requirements to be selected as the outcome of the slice-based cell reselection, the UE may continue to perform the next-frequency based cell reselection.

In some examples, when the UE determines to perform next-frequency based cell reselection, the UE may determine a highest ranked cell or a best cell on a next frequency (e.g., the next (or second) highest priority frequency of the selected slice) to be the next (or second) cell. That is, the next frequency is a different frequency from that on which the UE performs cell search (or cell measurement) for the first cell.

The highest ranked cell may refer to a cell with its rank (based on R criterion in 3GPP TS 38.304 v16.1.0) being the highest among all cells on the next (or second) highest priority frequency of the selected slice.

The highest ranked cell may refer to a cell with its rank (based on R criterion in 3GPP TS 38.304 v16.1.0) being the highest among all cells on the next (or second) highest priority frequency of the selected slice. Furthermore, the rank of the highest ranked cell should be higher than or equal to a rank threshold. The rank threshold is predefined or configured by the serving cell to the UE (e.g., via system information, via dedicated signaling).

The highest ranked cell may refer to a cell with its rank (based on R criterion in 3GPP TS 38.304 v16.1.0) being the highest among all cells on the next (or second) highest priority frequency of the selected slice. Furthermore, the signal quality/strength of the highest ranked cell should be higher than or equal to a signal quality/strength threshold. The signal quality/strength threshold is predefined or configured by the serving cell to the UE (e.g., via system information, via dedicated signaling).

The best cell may refer to a cell with its signal quality/strength being the best among all cells on the next (or second) highest priority frequency of the selected slice.

The best cell may refer to a cell with its signal quality/strength being the best among all cells on the next (or second) highest priority frequency of the selected slice. Furthermore, the signal quality/strength of the best cell should be higher than or equal to a signal quality/strength threshold. The signal quality/strength threshold is predefined or configured by the serving cell to the UE (e.g., via system information, via dedicated signaling).

The best cell may refer to a cell with its signal quality/strength being the best among all cells on the next (or second) highest priority frequency of the selected slice. Furthermore, the rank of the best cell should be higher than or equal to a rank threshold. The rank threshold is predefined or configured by the serving cell to the UE (e.g., via system information, via dedicated signaling).

The next frequency may be (but is not limited to) a frequency being the next (or second) highest priority frequency of the selected slice compared to the frequency where the first cell operates. That is, for the selected slice, the priority of the highest priority frequency is followed by the priority of the next (or second) highest priority frequency.

The next frequency may be (but is not limited to) a frequency being the highest priority frequency of another selected slice.

The other selected slice may be a default slice.

The other selected slice may have a lower or higher slice priority than the selected slice.

The slice priority of the other selected slice may be followed by the slice priority of the selected slice.

The slice priority of the selected slice may be followed by the slice priority of the other selected slice.

If the UE cannot determine a next frequency and/or a next cell in the next-frequency based cell reselection (e.g., only one frequency supports the selected slice), the UE may then reselect a slice. The rule that the UE reselects a slice may be the same as or different from the rule that the UE selects a slice. The reselected slice may be the same as or different from the selected slice. After the UE reselects a slice, the UE may perform the slice-based cell reselection, same-frequency based cell reselection, and/or next-frequency based cell reselection.

If the UE cannot determine a next frequency and/or a next cell in the next-frequency based cell reselection (e.g., only one frequency supports the selected slice), the UE may enter the cell selection sub-state.

In the cell reselection sub-state, the UE may continue to perform the slice-based cell reselection for a suitable cell or an acceptable cell.

If the UE cannot determine a next frequency and/or a next cell in the next-frequency based cell reselection (e.g., only one frequency supports the selected slice), the UE may continue to perform the same-frequency cell reselection on the same frequency, or the UE may continue to perform slice-based cell reselection on the same frequency.

In some examples, the UE may select the next (or second) cell on the next frequency as the outcome of the slice-based cell reselection.

In some examples, after the UE determines that the next (or second) cell on the next frequency supports the selected slice and is suitable, the UE may select the next (or second) cell as the outcome of the slice-based cell reselection.

In some examples, after the UE determines that the next (or second) cell on the next frequency supports the selected slice and is acceptable, the UE may select the next (or second) cell as the outcome of the slice-based cell reselection.

In some examples, after the UE determines that the next (or second) cell on the next frequency supports the selected slice, the UE may select the next (or second) cell as the outcome of the slice-based cell reselection.

In some examples, after the UE determines that the next (or second) cell on the next frequency is suitable, the UE may select the next (or second) cell as the outcome of the slice-based cell reselection.

In some examples, after the UE determines that the next (or second) cell on the next frequency is acceptable, the UE may select the next (or second) cell as the outcome of the slice-based cell reselection.

In some examples, the UE may not select the next (or second) cell on the next frequency as the outcome of the slice-based cell reselection.

In some examples, after the UE determines that the next (or second) cell on the next frequency does not support the selected slice, the UE may not select the next (or second) cell as the outcome of the slice-based cell reselection.

In some examples, after the UE determines that the next (or second) cell on the next frequency supports the selected slice, but is not suitable, the UE may not select the next (or second) cell as the outcome of the slice-based cell reselection.

In some examples, after the UE determines that the next (or second) cell on the next frequency supports the selected slice, but is not acceptable, the UE may not select the next (or second) cell as the outcome of the slice-based cell reselection.

In some examples, after the UE determines that the next (or second) cell on the next frequency is not suitable, the UE may not select the next (or second) cell as the outcome of the slice-based cell reselection.

In some examples, after the UE determines that the next (or second) cell on the next frequency is not acceptable, the UE may not select the next (or second) cell as the outcome of the slice-based cell reselection.

If the UE determines not to select the next (or second) cell on the next frequency as the outcome of the slice-based cell reselection, the UE may perform one or more of the following actions:

1. Continue to perform the same-frequency based cell reselection;
2. Continue to perform the next-frequency based cell reselection;
3. Continue to perform the legacy cell reselection;
4. Lower the priority of the frequency where the next (or second) cell operates;
5. Lower the priority of the frequency where the next (or second) cell operates for a period of time (e.g., 300s); and/or
6. Enter a cell selection sub-state.

If the UE determines not to select the next (or second) cell on the next frequency as the outcome of the slice-based cell reselection, the UE may further determine whether the number of cells that the UE has considered in the slice-based cell reselection, in the same-frequency based cell reselection, and/or in the next-frequency based cell reselection is greater than or equal to a value. The value is predefined or configured by the serving cell to the UE (e.g., via system information, via dedicated signaling).

In some examples, if the value is 2, and the UE has considered 2 cells in the slice-based cell reselection, but the 2 cells still do not meet the requirements to be selected as the outcome of the slice-based cell reselection, the UE may stop performing the slice-based cell reselection, same-frequency based cell reselection, and/or next-frequency based cell reselection for a period of time. The period of time may be predefined (e.g., 300s) or be configured/provided by the serving cell to the UE.

In some examples, if the value is 2, and the UE has considered 2 cells in the slice-based cell reselection, in the same-frequency based cell reselection, and/or in the next-frequency based cell reselection, but the 2 cells still do not meet the requirements to be selected as the outcome of the slice-based cell reselection, the UE may enter the cell selection sub-state.

In some examples, if the value is 2, and the UE has considered 2 cells in the next-frequency based cell reselection, but the 2 cells still do not meet the requirements to be selected as the outcome of the slice-based cell reselection, the UE may lower the priority of the frequency (e.g., to the lowest frequency priority) where the two cells operate for a period of time. The period of time may be predefined (e.g., 300s) or be configured/provided by the serving cell to the UE. Afterwards, the UE may or may not continue to perform the next-frequency based cell reselection.

If the UE determines not to select the next (or second) cell on the next frequency as the outcome of the slice-based cell reselection, the UE may further determine whether the number of frequencies that the UE has considered in the slice-based cell reselection, in the same-frequency based cell reselection, and/or in the next-frequency based cell reselection is greater than or equal to a value. The value is predefined or configured by the serving cell to the UE (e.g., via system information, via dedicated signaling).

In some examples, if the value is 3, and the UE has considered 3 frequencies in the slice-based cell reselection, but still cannot find any cell fulfilling the requirements to be selected as the outcome of the slice-based cell reselection, the UE may stop performing the slice-based cell reselection, same-frequency based cell reselection, and/or next-frequency based cell reselection for a period of time. The period of time may be predefined (e.g., 300s) or be configured/provided by the serving cell to the UE.

In some examples, if the value is 3, and the UE has considered 3 frequencies in the slice-based cell reselection, but still cannot find any cell fulfilling the requirements to be selected as the outcome of the slice-based cell reselection, the UE may enter any cell selection state.

In some examples, if the value is 3, and the UE has considered 3 frequencies in the slice-based cell reselection, but still cannot find any cell fulfilling the requirements to be selected as the outcome of the slice-based cell reselection, the UE may perform the legacy cell reselection.

The terms, such as NW, RAN, cell, camped cell, serving cell, base station, gNB, eNB, and ng-eNB are used interchangeably. Some of these terms may refer to the same network entity.

The UE may apply the previously mentioned examples to any RAT. The RAT may be (but is not limited to) NR, NR-U, LTE, E-UTRA connected to 5GC, LTE connected to 5GC, E-UTRA connected to EPC, and LTE connected to EPC. The UE may apply the previously mentioned examples in public networks or in private networks (e.g., NPN, SNPN, PNI-NPN).

The UE may apply the previously mentioned examples for licensed frequency or unlicensed frequency.

System information (SI) may refer to MIB, SIB1, and other SI. Minimum SI may include MIB and SIB1. Other SI may refer to SIB3, SIB4, SIB5, and other SIB(s).

Dedicated signaling may refer to (but is not limited to) RRC message(s). For example, the RRC message may include an RRC (Connection) Setup Request message, RRC (Connection) Setup message, RRC (Connection) Setup Complete message, RRC (Connection) Reconfiguration message, RRC Connection Reconfiguration message including the mobility control information, RRC Connection Reconfiguration message without the mobility control information inside, RRC Reconfiguration message including the configuration with sync, RRC Reconfiguration message without the configuration with sync inside, RRC (Connection) Reconfiguration Complete message, RRC (Connection) Resume Request message, RRC (Connection) Resume message, RRC (Connection) Resume Complete message, RRC (Connection) Reestablishment Request message, RRC (Connection) Reestablishment message, RRC (Connection) Reestablishment Complete message, RRC (Connection) Reject message, RRC (Connection) Release message, RRC System Information Request message, UE Assistance Information message, UE Capability Enquiry message, and UE Capability Information message. An RRC message may be one kind of dedicated signaling. The UE may receive the RRC message from the network via unicast/broadcast/groupcast.

The RRC_CONNECTED UE, RRC_INACTIVE UE, and RRC_IDLE UE may apply the previously mentioned examples.

An RRC_CONNECTED UE may be configured with an active BWP with common search space configured to monitor system information or paging.

The UE may measure a signal quality of a cell in terms of Reference Signal Received Quality (RSRQ).

The UE may measure a signal strength of a cell in terms of Reference Signal Received Power (RSRP) or Received Signal Strength Indication (RSSI).

The UE may perform the slice-based cell reselection when the UE is in RRC_INACTIVE state and performs the small data transmission (SDT) procedure.

The UE may perform the slice-based cell reselection in SNPN AM or not in SNPN AM.

The frequency as previously mentioned in this disclosure may be indicated by an ARFCN value.

If the UE's intended slice(s) is not (pre)configured to the UE and the condition for the UE to perform cell (re)selection is triggered, the UE may perform the legacy cell (re)selection.

If the UE's intended slice(s) is released or removed and the condition to perform cell (re)selection is triggered, the UE may perform the legacy cell (re)selection. For example, when the condition to perform the slice-based cell (re)selection is triggered (or is satisfied), but the UE's intended slice(s) is released or removed, the UE may perform the legacy cell (re)selection.

The UE in RRC_INACTIVE state may perform RNAU periodically (e.g., when a timer expires).

The UE in RRC_INACTIVE state may perform the RNAU when a specific event happens, such as when the UE camps on a cell that does not belong to the UE's configured RNA.

A Network Identifier (NID) may represent the identifier of an SNPN in combination with a PLMN ID.

An NPN may refer to the network deployed for a non-public usage.

The PNI-NPN identity may represent the identifier of a PNI-NPN including a PLMN ID and a CAG (Closed Access Group) ID combination.

A registered SNPN may refer to the SNPN on which certain location registration outcomes have occurred.

A selected SNPN may refer to the SNPN that has been selected by the NAS (e.g., the NAS of the UE, the NAS of the CN), either manually or automatically.

An SNPN AM may represent the mode of operation where the UE only selects SNPNs.

An SNPN identity may represent the identifier of an SNPN including a PLMN ID and an NID combination.

At least two frequencies may be configured with the same priority (e.g., the highest priority). Thus, the highest priority frequency and the highest priority frequencies may be interchangeably described in this disclosure. More specifically, "frequency" and "frequencies" may be interchangeably applied in this disclosure.

The UE may receive an RRC message (e.g., RRC Release message with/without suspend configuration) including UE-specific information, such as the information of slice priority, the information of frequency priority, slice information of the serving cell and slice information of the neighboring cells. The UE-specific information may be associated with one specific time period. The length of the specific time period may be predefined in the UE. Alternatively, the UE may receive the length of the specific time period in the same RRC message that includes the associated UE-specific information.

For example, the UE may (re)start a timer with an initial value that is the same as the length of time period when (or after) the UE receives (or is configured with) the associated UE-specific information.

For example, the UE may maintain (and/or apply) the UE-specific information (only) when the timer is running.

For example, when the timer expires, the UE may release (or remove) the associated UE-specific information. In some examples, when the timer expires, the UE may stop applying the associated UE-specific information.

For example, after the UE releases the associated UE-specific information or stops applying the associated UE-specific information, the UE may apply cell-specific (or area-specific) information.

For example, the UE may receive system information (e.g., SIB1, other SI, slice-specific SIB) that includes cell-specific (or area-specific) information, such as the information of slice priority, the information of frequency priority, slice information of the serving cell, and slice information of the neighboring cells.

For example, the UE may stop the timer when the UE determines not to apply the associated UE-specific information.

The UE may apply the previously mentioned examples to perform a slice-based cell selection or a slice-based cell reselection.

Figure 3:
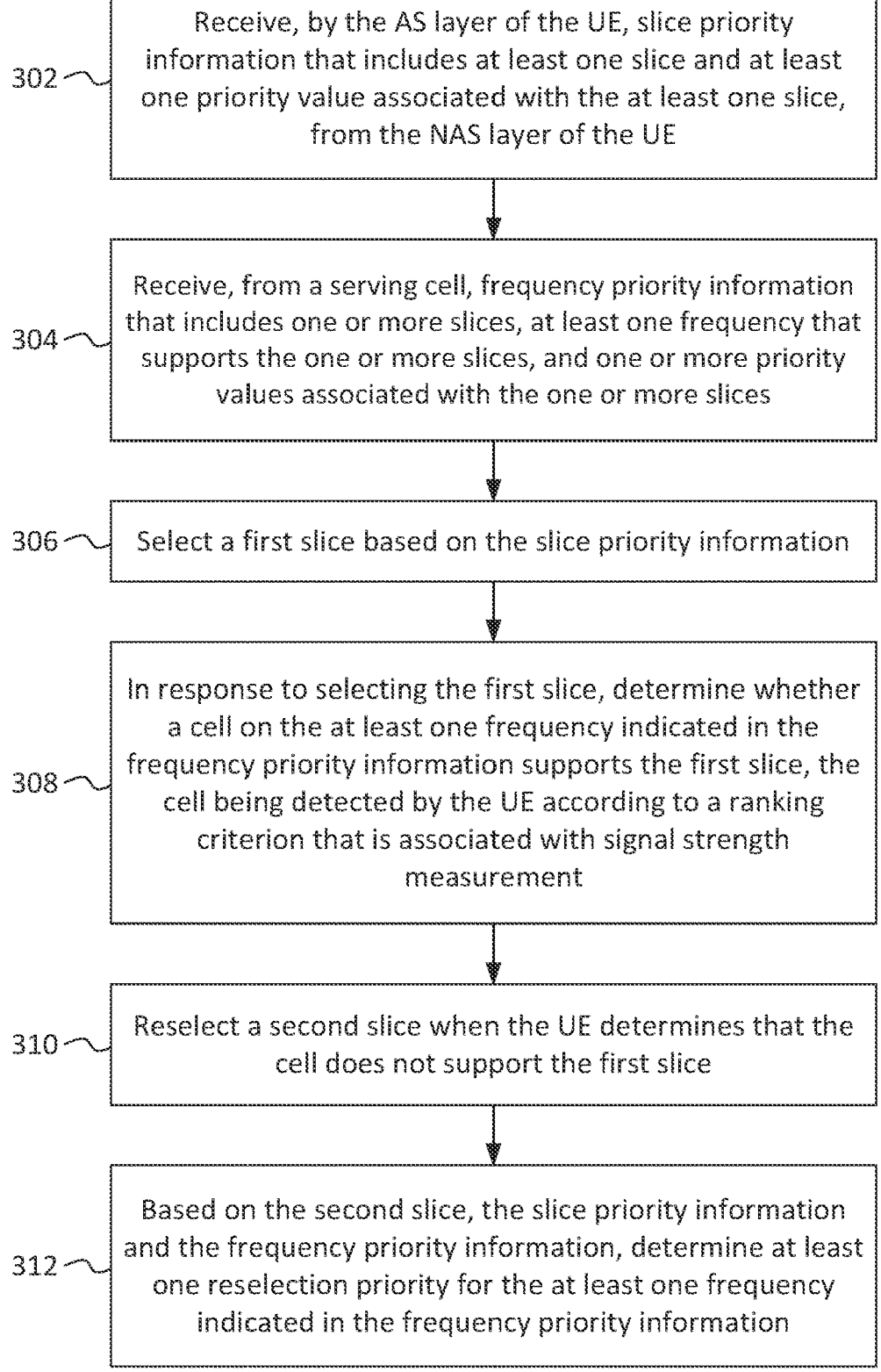
FIG. 3 is a flowchart illustrating a method/process for a slice-based cell reselection, according to an implementation of the present disclosure.

FIG. 3 is a flowchart illustrating a method/process 300 for a slice-based cell reselection, according to an implementation of the present disclosure. In action 302, the UE receives, by the AS layer of the UE, slice priority information that includes at least one slice and at least one priority value associated with the at least one slice, from the NAS layer of the UE. In action 304, the UE receives, from a serving cell, frequency priority information that includes one or more slices, at least one frequency that supports the one or more slices, and one or more priority values associated with the one or more slices. In action 306, the UE selects a first slice based on the slice priority information. In action 308, the UE, in response to selecting the first slice, determines whether a cell on the at least one frequency indicated in the frequency priority information supports the first slice, the cell being detected by the UE according to a ranking criterion that is associated with signal strength measurement. In action 310, the UE reselects a second slice when the UE determines that the cell does not support the first slice. In action 312, the UE, based on the second slice, the slice priority information, and the frequency priority information, determines at least one reselection priority for the at least one frequency indicated in the frequency priority information.

In some examples, a first reselection priority of the at least one reselection priority for a first frequency indicated in the frequency priority information is determined according to a first priority value indicated in the frequency priority information. The first frequency supports the second slice, and the first priority value is associated with the second slice.

In some examples, the UE selects the first slice according to an order of the priority values indicated in the slice priority information.

In some examples, the UE receives the frequency priority information via at least one of a SIB or a RRC Release message.

In some examples, the UE may ignore the frequency priority information received via the SIB when the frequency priority information is received via the RRC Release message.

In some examples, the slice-based cell reselection is performed via a cell search on a frequency with the highest reselection priority that is determined by the UE.

In some examples, the frequency priority information includes a per-frequency entity list, each entity corresponding to a frequency and including at least one slice that is supported by the frequency and priority values associated with the at least one slice.

In some examples, the number of entities of the per-frequency entity list is the number of frequencies that includes at least a second frequency and a third frequency.

In some examples, a first entity of the per-frequency entity list corresponds to the second frequency that is supported by the serving cell, and includes at least one slice that is supported by the serving cell, and a second entity of the entity list corresponds to the third frequency that is supported by a neighboring cell, and includes at least one slice that is supported by the neighboring cell.

In some examples, the UE determines that the first reselection priority is higher than a second reselection priority for a second frequency indicated in the frequency priority information when the first priority value is higher than a second priority value associated with the second slice that is supported by the second frequency.

In some examples, the UE determines a second reselection priority for a second frequency indicated in the frequency priority information according to a frequency priority indicated in the frequency priority information, and the second frequency does not support the at least one slice indicated in the slice priority information.

In some examples, the UE determines that the first reselection priority is higher than a second reselection priority for a second frequency indicated in the frequency priority information, and the second frequency does not support the at least one slice indicated in the slice priority information or does not support the second slice.

Figure 4:
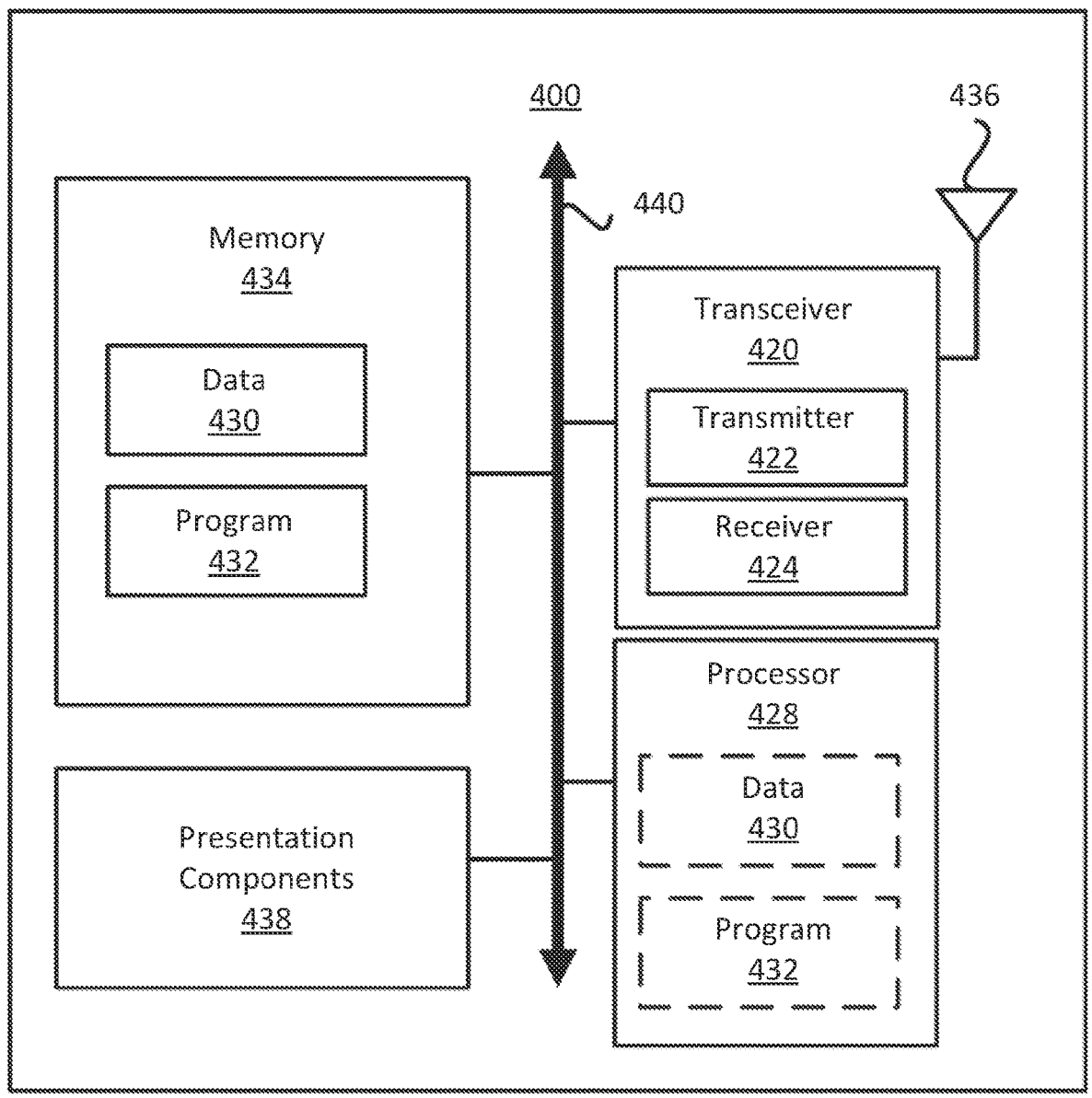
FIG. 4 is a block diagram illustrating a node for wireless communication, according to an implementation of the present disclosure.

FIG. 4 is a block diagram illustrating a node 400 for wireless communication, according to an implementation of the present disclosure.

As illustrated in FIG. 4, the node 400 may include a transceiver 420, a processor 428, a memory 434, one or more presentation components 438, and at least one antenna 436. The node 400 may also include a Radio Frequency (RF) spectrum band module, a BS communications module, a network communications module, a system communications management module, input/output (I/O) ports, I/O components, and a power supply (not illustrated in FIG. 4).

Each of these components may be in communication with each other, directly or indirectly, over one or more buses 440. The node 400 may be a UE or a BS that performs various disclosed functions illustrated in FIG. 3 and examples/implementations in this disclosure.

The transceiver 420 may include a transmitter 422 (with transmitting circuitry) and a receiver 424 (with receiving circuitry) and may be configured to transmit and/or receive time and/or frequency resource partitioning information. The transceiver 420 may be configured to transmit in different types of subframes and slots including, but not limited to, usable, non-usable, and flexibly usable subframes and slot formats. The transceiver 420 may be configured to receive data and control channels.

The node 400 may include a variety of computer-readable media. Computer-readable media may be any media that can be accessed by the node 400 and include both volatile (and non-volatile) media and removable (and non-removable) media. Computer-readable media may include computer storage media and communication media. Computer storage media may include both volatile (and/or non-volatile), as well as removable (and/or non-removable), media implemented according to any method or technology for storage of information such as computer-readable media.

Computer storage media may include RAM, ROM, EPROM, EEPROM, flash memory (or other memory technology), CD-ROM, Digital Versatile Disk (DVD) (or other optical disk storage), magnetic cassettes, magnetic tape, magnetic disk storage (or other magnetic storage devices), etc. Computer storage media do not include a propagated data signal.

Communication media may typically embody computer-readable instructions, data structures, program modules, or other data in a modulated data signal, such as a carrier wave or other transport mechanisms and include any information delivery media. The term "modulated data signal" may mean a signal that has one or more of its characteristics set or changed in such a manner as to encode information in the signal. Communication media may include wired media, such as a wired network or direct-wired connection, and wireless media, such as acoustic, RF, infrared, and other wireless media. Combinations of any of the disclosed media should be included within the scope of computer-readable media.

The memory 434 may include computer-storage media in the form of volatile and/or non-volatile memory. The memory 434 may be removable, non-removable, or a combination thereof. For example, the memory 434 may include solid-state memory, hard drives, optical-disc drives, etc. As illustrated in FIG. 4, the memory 434 may store computer-readable and/or computer-executable instructions 432 (e.g., software codes) that are configured to, when executed, cause the processor 428 (e.g., processing circuitry) to perform various disclosed functions. Alternatively, the instructions 432 may not be directly executable by the processor 428, but may be configured to cause the node 400 (e.g., when compiled and executed) to perform various disclosed functions.

The processor 428 may include an intelligent hardware device, a central processing unit (CPU), a microcontroller, an ASIC, etc. The processor 428 may include memory. The processor 428 may process the data 430 and the instructions 432 received from the memory 434, and information received through the transceiver 420, the baseband communications module, and/or the network communications module. The processor 428 may also process information sent to the transceiver 420 for transmission via the antenna 436, and/or to the network communications module for transmission to a CN.

One or more presentation components 438 may present data to a person or other devices. Presentation components 438 may include a display device, a speaker, a printing component, a vibrating component, etc.

From the present disclosure, it is evident that various techniques can be utilized for implementing the disclosed concepts without departing from the scope of those concepts. Moreover, while the concepts have been disclosed with specific reference to specific implementations, a person of ordinary skill in the art would recognize that changes can be made in form and detail without departing from the scope of those concepts. As such, the present disclosure is to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method for a user equipment (UE) for performing slice-based cell reselection, the method comprising:
   receiving, from a non-access stratum (NAS) layer of the UE, by an access stratum (AS) layer of the UE, slice priority information that includes at least one slice and at least one priority value associated with the at least one slice;
   receiving, from a serving cell, frequency priority information that includes one or more slices, at least one frequency that supports the one or more slices, and one or more priority values associated with the one or more slices;
   selecting a first slice of the at least one slice based on the slice priority information;
   in response to selecting the first slice, determining whether a cell on the at least one frequency indicated in the frequency priority information supports the first slice, the cell being detected by the UE according to a ranking criterion that is associated with a signal strength measurement;
   reselecting a second slice of the at least one slice when the UE determines that the cell does not support the first slice; and
   based on the second slice, the slice priority information, and the frequency priority information, determining at least one reselection priority for the at least one frequency indicated in the frequency priority information, wherein:
   a first reselection priority of the at least one reselection priority for a first frequency of the at least one frequency indicated in the frequency priority information is determined according to a first priority value of the one or more priority values indicated in the frequency priority information,
   the first frequency supports the second slice, and
   the first priority value is associated with the second slice.

2. The method of claim 1, wherein the first slice is selected by the UE according to an order of the at least one priority value indicated in the slice priority information.

3. The method of claim 1, wherein the frequency priority information is received from at least one of a system information block (SIB) or a radio resource control (RRC) Release message.

4. The method of claim 3, further comprising:
   ignoring the frequency priority information received via the SIB when the frequency priority information is received via the RRC Release message.

5. The method of claim 1, wherein the slice-based cell reselection is performed via a cell search on a particular frequency with a highest reselection priority that is determined by the UE.

6. The method of claim 1, wherein the frequency priority information includes a per-frequency entity list, each entity of the per-frequency entity list corresponding to one of the at least one frequency and including:
   at least one of the one or more slices that is supported by the one of the at least one frequency, and
   at least one of the one or more priority values that is associated with the at least one of the one or more slices.

7. The method of claim 6, wherein:
   a number of entities of the per-frequency entity list is equal to a number of the at least one frequency that includes at least a second frequency and a third frequency,
   a first entity of the per-frequency entity list corresponds to the second frequency that is supported by the serving cell, and includes at least one first slice that is supported by the serving cell, and
   a second entity of the per-frequency entity list corresponds to the third frequency that is supported by a neighboring cell, and includes at least one second slice that is supported by the neighboring cell.

8. The method of claim 1, wherein the first reselection priority is higher than a second reselection priority for a second frequency indicated in the frequency priority information when the first priority value is higher than a second priority value associated with the second slice that is supported by the second frequency.

9. The method of claim 1, wherein a second reselection priority for a second frequency indicated in the frequency priority information is determined according to a frequency priority indicated in the frequency priority information, and the second frequency does not support the at least one slice indicated in the slice priority information.

10. The method of claim 1, wherein the first reselection priority is higher than a second reselection priority for a second frequency indicated in the frequency priority information, and the second frequency does not support the at least one slice indicated in the slice priority information or does not support the second slice.

11. A user equipment (UE) for performing slice-based cell reselection, the UE comprising:
at least one processor; and
at least one non-transitory computer-readable medium coupled to the at least one processor and storing one or more computer-executable instructions that, when executed by the at least one processor, cause the UE to:
receive, from a non-access stratum (NAS) layer of the UE, by an access stratum (AS) layer of the UE, slice priority information that includes at least one slice and at least one priority value associated with the at least one slice;
receive, from a serving cell, frequency priority information that includes one or more slices, at least one frequency that supports the one or more slices, and one or more priority value associated with the one or more slices;
select a first slice of the at least one slice based on the slice priority information;
in response to selecting the first slice, determine whether a cell on the at least one frequency indicated in the frequency priority information supports the first slice, the cell being detected by the UE according to a ranking criterion that is associated with a signal strength measurement;
reselect a second slice of the at least one slice when the UE determines that the cell does not support the first slice; and
based on the second slice, the slice priority information, and the frequency priority information, determine at least one reselection priority for the at least one frequency indicated in the frequency priority information, wherein:
a first reselection priority of the at least one reselection priority for a first frequency of the at least one frequency indicated in the frequency priority information is determined according to a first priority value of the one or more priority values indicated in the frequency priority information,
the first frequency supports the second slice, and
the first priority value is associated with the second slice.

12. The UE of claim 11, wherein the first slice is selected by the UE according to an order of the at least one priority value indicated in the slice priority information.

13. The UE of claim 11, wherein the frequency priority information is received from at least one of a system information block (SIB) or a radio resource control (RRC) Release message.

14. The UE of claim 13, the one or more computer-executable instructions, when executed by the at least one processor, further cause the UE to:
ignore the frequency priority information received via the SIB when the frequency priority information is received via the RRC Release message.

15. The UE of claim 11, wherein the slice-based cell reselection is performed via a cell search on a particular frequency with a highest reselection priority that is determined by the UE.

16. The UE of claim 11, wherein the frequency priority information includes a per-frequency entity list, each entity of the per-frequency entity list corresponding to one of the at least one frequency and including:
at least one of the one or more slices that is supported by the one of the at least one frequency, and
at least one of the one or more priority values that is associated with the at least one of the one or more slices.

17. The UE of claim 16, wherein:
a number of entities of the per-frequency entity list is equal to a number of the at least one frequency that includes at least a second frequency and a third frequency,
a first entity of the per-frequency entity list corresponds to the second frequency that is supported by the serving cell, and includes at least one first slice that is supported by the serving cell, and
a second entity of the per-frequency entity list corresponds to the third frequency that is supported by a neighboring cell, and includes at least one second slice that is supported by the neighboring cell.

18. The UE of claim 11, wherein the first reselection priority is higher than a second reselection priority for a second frequency indicated in the frequency priority information when the first priority value is higher than a second priority value associated with the second slice that is supported by the second frequency.

19. The UE of claim 11, wherein a second reselection priority for a second frequency indicated in the frequency priority information is determined according to a frequency priority indicated in the frequency priority information, and the second frequency does not support the at least one slice indicated in the slice priority information.

20. The UE of claim 11, wherein the first reselection priority is higher than a second reselection priority for a second frequency indicated in the frequency priority information, and the second frequency does not support the at least one slice indicated in the slice priority information or does not support the second slice.

* * * * *